(12) United States Patent
Pavek et al.

(10) Patent No.: US 9,953,244 B2
(45) Date of Patent: Apr. 24, 2018

(54) APPARATUS AND METHOD FOR SINGLE LOOK MAIN LOBE AND SIDELOBE DISCRIMINATION IN SPECTRAL DOMAIN IMAGES

(71) Applicant: RFNAV, Inc, Glenelg, MD (US)

(72) Inventors: Richard E. Pavek, Marble Falls, TX (US); Jefferson M. Willey, Glenelg, MD (US)

(73) Assignee: RFNAV, INC., Glenelg, MD (US)

( * ) Notice: Subject to any disclaimer, the term of this patent is extended or adjusted under 35 U.S.C. 154(b) by 0 days.

(21) Appl. No.: 15/677,376

(22) Filed: Aug. 15, 2017

(65) Prior Publication Data

US 2018/0053070 A1    Feb. 22, 2018

Related U.S. Application Data

(60) Provisional application No. 62/375,882, filed on Aug. 16, 2016, provisional application No. 62/383,387, (Continued)

(51) Int. Cl.
*G06K 9/62* (2006.01)
*G06K 9/52* (2006.01)

(52) U.S. Cl.
CPC ........... *G06K 9/6245* (2013.01); *G06K 9/522* (2013.01); *G06K 9/623* (2013.01); *G06K 9/6277* (2013.01);
(Continued)

(58) Field of Classification Search
CPC ...... G06F 17/14; G06F 17/141; G06F 17/142; G06K 9/6245; G06K 9/522; G06K 9/6277;
(Continued)

(56) References Cited

U.S. PATENT DOCUMENTS 5,686,922 A    11/1997   Stankwitz et al.
6,298,363 B1 *  10/2001  Iannuzzelli ........... G06F 17/141
                                                708/400
(Continued)

FOREIGN PATENT DOCUMENTS

WO    WO 2011/002316          1/2011
WO    WO 2011002316 A1 *      1/2011   ............. G01S 7/023

OTHER PUBLICATIONS

Park and Sandberg, "Universal Approximation Using Radial-Basis-Function Networks," *Neural Computation*, vol. 3, pp. 246-257, 1991.

(Continued)

*Primary Examiner* — Geoffrey E Summers
(74) *Attorney, Agent, or Firm* — Edell, Shapiro & Finnan, LLC

(57) ABSTRACT

A system performs operations including receiving multi-dimensional single-look data from a sensor, applying multi-dimensional complex weighting functions including apodizations from among a general class of such functions to the complex data, so as to induce nonlinear variations in the amplitude and phase of the multi-dimensional spectral image responses, forming a number of features per voxel across a number of multi-dimensional spectral image responses, and using a multi-dimensional non-parametric classifier to form features to discriminate main lobe from sidelobe imaged voxels with the weighting function applied to received data. The operations include identifying each voxel by processing a set of transforms from the multi-dimensional complex weighting functions and outputting a multi-dimensional main lobe binary image, representing main lobe versus sidelobe locations.

16 Claims, 26 Drawing Sheets

Related U.S. Application Data filed on Sep. 3, 2016, provisional application No. 62/385,752, filed on Sep. 9, 2016.

(52) U.S. Cl.
CPC ....... *G06K 9/6298* (2013.01); *G06K 2209/40* (2013.01)

(58) Field of Classification Search
CPC ... G06K 9/6298; G06K 9/623; G06K 2209/40
USPC .......... 708/403, 404, 405; 342/159, 379, 39
See application file for complete search history.

(56) References Cited

U.S. PATENT DOCUMENTS

| | | | |
|---|---|---|---|
| 7,978,926 B2 | 7/2011 | Fairbanks et al. | |
| 2013/0151201 A1* | 6/2013 | McCorkle | G06F 17/141 |
| | | | 702/189 |

OTHER PUBLICATIONS

Parzen, E., "On Estimation of a Probability Density Function and Mode," Technical Report #40, Applied Mathematics and Statistics Laboratories, Stanford University, Stanford, CA, Aug. 21, 1961 (32 pages).

Richards, M., "Fundamentals of Radar Signal Processing," 2nd Edition, ISBN: 0071798323, McGraw-Hill Education, New York, pp. 413-425, 2014.

\* cited by examiner

APPARATUS AND METHOD FOR SINGLE LOOK MAIN LOBE AND SIDELOBE DISCRIMINATION IN SPECTRAL DOMAIN IMAGES

CLAIM OF PRIORITY

This application claims priority U.S. Patent Application Ser. No. 62/375,882, filed on Aug. 16, 2016, U.S. Patent Application Ser. No. 62/383,387, filed on Sep. 3, 2016, and U.S. Patent Application Ser. No. 62/385,752, filed on Sep. 9, 2016, the contents of which are incorporated here by reference in their entirety.

BACKGROUND

Many sensing systems, such as Sonar, Radar, and seismic sensors, employ Fourier domain processing to form images from time and space sampled data. As an example, the spectral domain images may include range, elevation angle, and azimuthal angle from Fourier transforms of de-chirped LFM time domain signals and space sampled signals across a phased 2-dimensional array aperture.

Fourier transform processing of a finite sample of time or space data frequently results in spectral leakage. During the formation of spectral images, the spectral leakage, also known as sidelobes, generates false, or artificial signals. In dense high dynamic range scenes, the artifacts and sidelobes make it difficult to determine which signals are true signals.

SUMMARY

The systems and techniques described here relate to achieving more accurate spectral images in dense scenes by detecting true main lobe locations and discarding false targets from spectral sidelobes, which detract from image quality and scene interpretation. These systems and techniques apply to multi-dimensional imaging of all sensors with Fourier-based imaging in many applications. This enables more accurate multi-dimensional imaging and more reliable object determination and object location in radar systems operating in dense scenes such as those found in autonomous vehicle applications.

In an aspect, a system includes a computing device comprising a memory configured to store instructions and a processor to execute the instructions to perform operations. The operations include receiving multi-dimensional single-look data from a sensor, applying a number of multi-dimensional complex weighting functions including apodizations from among a general class of such functions to the complex data, so as to induce nonlinear variations in the amplitude and phase of the multi-dimensional spectral image responses, forming a number of features per voxel across a number of multi-dimensional spectral image responses, using a multi-dimensional non-parametric classifier to form features to discriminate main lobe from sidelobe imaged voxels with the weighting functions applied to received data, identifying each voxel by thresholding classifier statistics, and outputting a multi-dimensional main lobe binary image, representing main lobe versus sidelobe locations.

The multi-dimensional non-parametric classifier operations include processing a set of transforms to form a number of statistics based on a number of features per voxel and a number of voxels, surrounding and including each voxel under test, identifying each voxel under test as a main lobe versus sidelobe with high confidence by thresholding the statistics, and outputting a multi-dimensional main lobe binary image representing main lobe versus sidelobe locations with high confidence.

Receiving a multi-dimensional matrix comprised of signals received from any number of looks from a multi-dimensional sensor system that generates images on the basis of spectral domain processing.

Selecting a set of multi-dimensional complex weighting functions in the processor according to scene parameters including scene density.

Selecting a set of features and neighborhood voxels used in feature vector formation in the processor according to scene parameters including scene density.

Selecting a set of classifier weights and thresholds in the processor according to scene parameters including scene density.

The main lobe versus sidelobe discrimination skill is primed with complex nonlinear weights, and feature vectors chosen to have maximal separation in their joint probability density functions.

The complex weights include apodization weight values raised to non-integer powers, and other weights constructed with a number of zero replacements only near the ends of the weighting function to avoid grating lobes.

Selecting a set of multi-dimensional complex weighting functions in the processor according to sub-volume scene parameters including scene density.

Selecting a set of features and neighborhood voxels used in feature vector formation in the processor according to sub-volume scene parameters including scene density.

Selecting a set of classifier weights and thresholds in the processor according to sub-volume scene parameters including scene density.

With a neighborhood voxel span for a multi-dimensional scene, the hardware implementation is simplified with a lookup table to select main lobe versus sidelobe discrimination thresholds.

Production of voxel-level discrimination between main lobes and sidelobes.

The MLSL discriminator has reduced complexity by avoiding convolution.

In an aspect, one or more computer readable media storing instructions that are executable by a processing device, and upon such execution cause the processing device to perform operations. The operations include receiving multi-dimensional single-look data from a sensor, and applying a number of multi-dimensional complex weighting functions including apodizations from among a general class of such functions to the complex data, so as to induce nonlinear variations in the amplitude and phase of the multi-dimensional spectral image responses. The operations include forming a number of features per voxel across a number of multi-dimensional spectral image responses, and using a multi-dimensional non-parametric classifier to form statistics from features to discriminate main lobe from sidelobe imaged voxels with the weighting function applied to received data, and identifying each voxel by thresholding classifier statistics, and outputting a multi-dimensional main lobe binary image, representing main lobe versus sidelobe locations.

These and other aspects and features and various combinations of them may be expressed as methods, apparatus, systems, means for performing functions, program products, and in other ways.

Other features and advantages will be apparent from the description and the claims.

DETAILED DESCRIPTION

Figure 1:
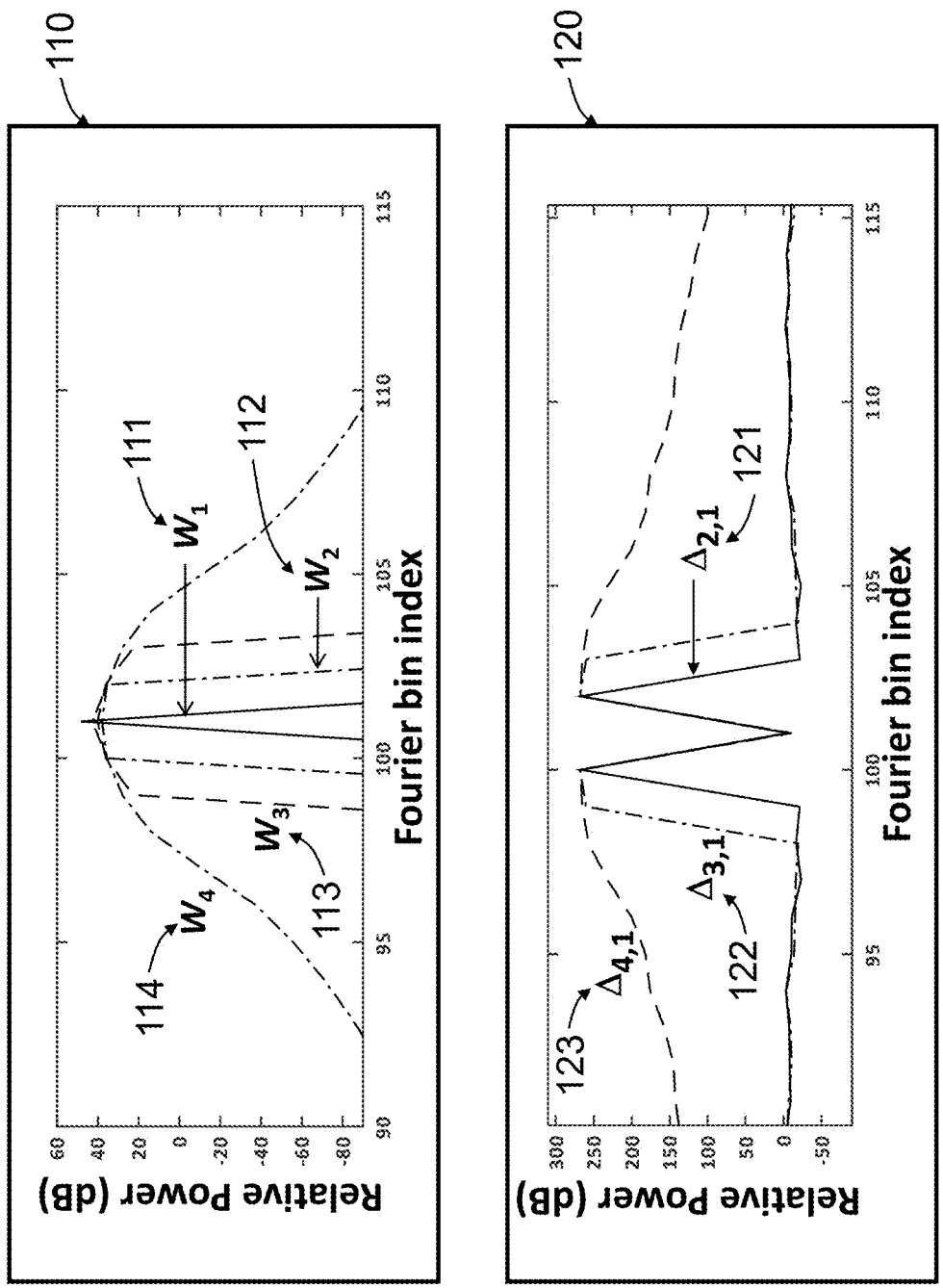
FIG. 1 are spectral domain plots of fractional apodizations and their power differences for a tone centered in a spectral bin.

Many sensing systems, such as Sonar, Radar, and seismic sensors, employ Fourier domain processing to form images from time and space sampled data. As an example, the spectral domain images may include range, elevation angle, and azimuthal angle from Fourier transforms of de-chirped LFM time domain signals and space sampled signals across a 2-dimensional phased array aperture.

It is well known that Fourier transform processing of a finite sample of time or space data frequently results in spectral leakage. During the formation of spectral images, the spectral leakage, also known as sidelobes, generates false, or artificial signals. In dense high dynamic range scenes, the artifacts and sidelobes make it difficult to determine which signals are true signals.

This subject matter discloses an apparatus and method that identifies Main lobe (ML) signals versus false sidelobe (SL) signals in the power spectrum. In contrast, the prior art focuses on sidelobe suppression, followed by downstream processing methods such as peak identification in the power spectrum with thresholding or CFAR like processes. The local peak finding property of CFAR has difficulty in densely populated high dynamic range scenes in contrast with the main lobe/sidelobe (MLSL) discrimination method introduced herein.

For context, the method for sidelobe suppression, or spectral leakage, is briefly reviewed. To reduce the spectral leakage the early prior art employs multiple apodizations, or amplitude weightings, also known as windowing, of the time or space domain signals. More current art employs: one, an adaptive windowing with a convolution kernel to further suppress spectral leakage; and two, time domain prefiltering and non-prefiltering with multiple simultaneous windows and the final spectrum taken as the minimum of each frequency bin across all the spectra.

While the above techniques can result in a power spectrum with reduced sidelobe levels, sidelobe leakage is still present. In dense scenes, the leakage could be interpreted as a valid target or potentially mask still weaker targets. The question remaining is how to detect a true ML signal in the presence of sidelobes. Frequently, a constant false alarm rate (CFAR) process is swept across a power spectrum to discern local peaks from sidelobes. While there are many adaptive CFAR variants, the CFAR process is a local peak finder relative to some statistic of the background. For a cell averaging CFAR, a ratio of a test frequency bin power level relative to an average background power level taken from nearby frequency bins is formed. When the ratio exceeds a threshold, a detection is declared. The local peak finding property of the CFAR is effective when the power spectrum is sparse, e.g. when one true ML signal, with a high ratio of signal to noise power, is present in the power spectrum. On the other hand, when many ML signals are present with variable sparsity, variable dynamic range, variable fractional Fourier bin offset, and random phase, the identification of ML signals is severely compromised.

This subject matter directly classifies both true ML signals and false SL signals using statistical classification of voxel-level features developed from multiple, non-linearly perturbed, spectral domain images. First, multiple complex non-linear weighting and apodizations are applied to a single look N-dimensional (N-D) input domain dataset. Next, N-D Fourier transforms generate multiple perturbed spectral domain images. The perturbations cause the ML and SL magnitudes and phases to have different probability distributions. Voxel-level statistical features are developed to exploit the differences between MLs and SLs. A non-parametric statistical classifier produces high confidence discrimination between main lobes and sidelobes.

First, MLs and SLs are defined in the context of discrimination. Then some input domain apodizations and other weighting functions are shown to have different ML and SL voxel level probability distributions.

Consider the definition of MLs and SLs in the context of discrimination. Typical apodization or window functions such as Hann, Hamming, Chebyshev, etc., generate a spectral domain response marked by a high power main lobe and lower power sidelobe regions. The main lobe region is typically defined by its half-power spread centered on the filter bin wherein the true signal lies. The broad main lobe region may occupy multiple spectral filter bins and depends on the spatial resolution and the true signal's fractional position within a filter bin.

The objective is to identify and locate the one central bin containing the true signal frequency. Accordingly, this subject matter considers only the one central filter bin where the true signal lies as the main lobe; all other filter bins are considered sidelobes. For the case when the true signal falls on the boundary between adjacent filter bins, the true signal is assumed to be associated as the lower of the two filter bin indices. Without loss of generality, true signals are referred to as main lobes, and false signals are referred to as sidelobes.

Instead of sidelobe suppression followed by local peak finding with CFAR to identify main lobes, a statistical approach is employed to identify main lobes and sidelobes and thusly discriminate between them. The method exploits the main lobe and sidelobe probability distribution differences for spectral domain discriminants obtained from different non-linear apodizations and complex weighting functions applied to the input domain. The probability distributions arise, in a part, due to the uncertainty of fractional frequency within a filter bin, phase, and amplitude of the true but unknown signals.

Consider the effect of uncertainty in the frequency of a true signal and its effect on frequency domain discriminants obtained from different apodizations. Let the true time domain signal be represented by the discrete time data set, S, containing $N_b$ samples. Further assume that S represents a single tone with its frequency chosen so that it is centered in a frequency bin after taking a Fast Fourier Transform (FFT). Now let S be weighted by four different apodizations with different powers denoted as, $$W_1 = H^{0.700} \quad (1)$$

$$W_2 = H^{0.705} \quad (2)$$

$$W_3 = H^{0.745} \quad (3)$$

$$W_4 = H^{0.750} \quad (4)$$

Where $H^p$ is the $N_b$ point symmetric Hamming window where each weight in the set is raised to the $p^{th}$ power. The complex spectrum, $F_k$, for each weight, $W_k$, is, $F_k$=FFT(S⊙$W_k$) where S⊙$W_k$ is the Hadamard product of S and $W_k$ and FFT is the fast Fourier transform operation. The associated power spectra, labeled with each applied weight 111, 112, 113, 114, are shown in top part 110, of FIG. 1.

The differences in the power spectrum indicate a potential for discrimination between main lobes and sidelobes. Consider a subset of some Fourier bin-wise discriminant functions such as, $$\Delta_{m,n,q} = dB(F_{m,q}) - dB(F_{n,q}) \quad (5)$$

$$\Delta_{min,n,q} = \min(dB(F_{1,q}), dB(F_{2,q}), dB(F_{3,q}), dB(F_{4,q})) - dB(F_{n,q}) \quad (6)$$

The notations, $F_{m,q}$ is the Fourier coefficient contained in the $q^{th}$ bin of $F_m$, $dB(F_{m,q})$ is the compact notation representing 20 $\log_{10}(|F_{m,q}|)$, and min(a,b, . . . ) is the minimum of the quantities (a,b, . . . ). For convenience, the notation $\Delta_{m,n}$ represents the vector formed by concatenation of $\Delta_{m,n,q}$ across all q bins. Similarly, the notation $\Delta_{min,n}$ represents the vector formed by concatenation of $\Delta_{min,n,q}$ across all q bins.

The selected vectors, $\Delta_{2,1}$, 121, $\Delta_{3,1}$, 122, $\Delta_{4,1}$, 123 over the entire frequency support, are shown in the bottom portion 120 of FIG. 1. Some of the discriminants show marked changes in the distant sidelobes far from the main lobe. On the other hand, the discriminants have a different characteristic in the local neighborhood of the main lobe: the discriminants for a bin centered tone show abrupt magnitude changes with polarity reversal at the main lobe bin. This suggests that to detect a main lobe or a sidelobe, the optimal decision boundaries for a given discriminant may vary as a function of the distance from a main lobe. Further, that the decision boundaries are also dependent on the adjacency or distance from a main lobe, and therefore a function of the relative sparsity of the signals in the frequency domain.

Figure 2:
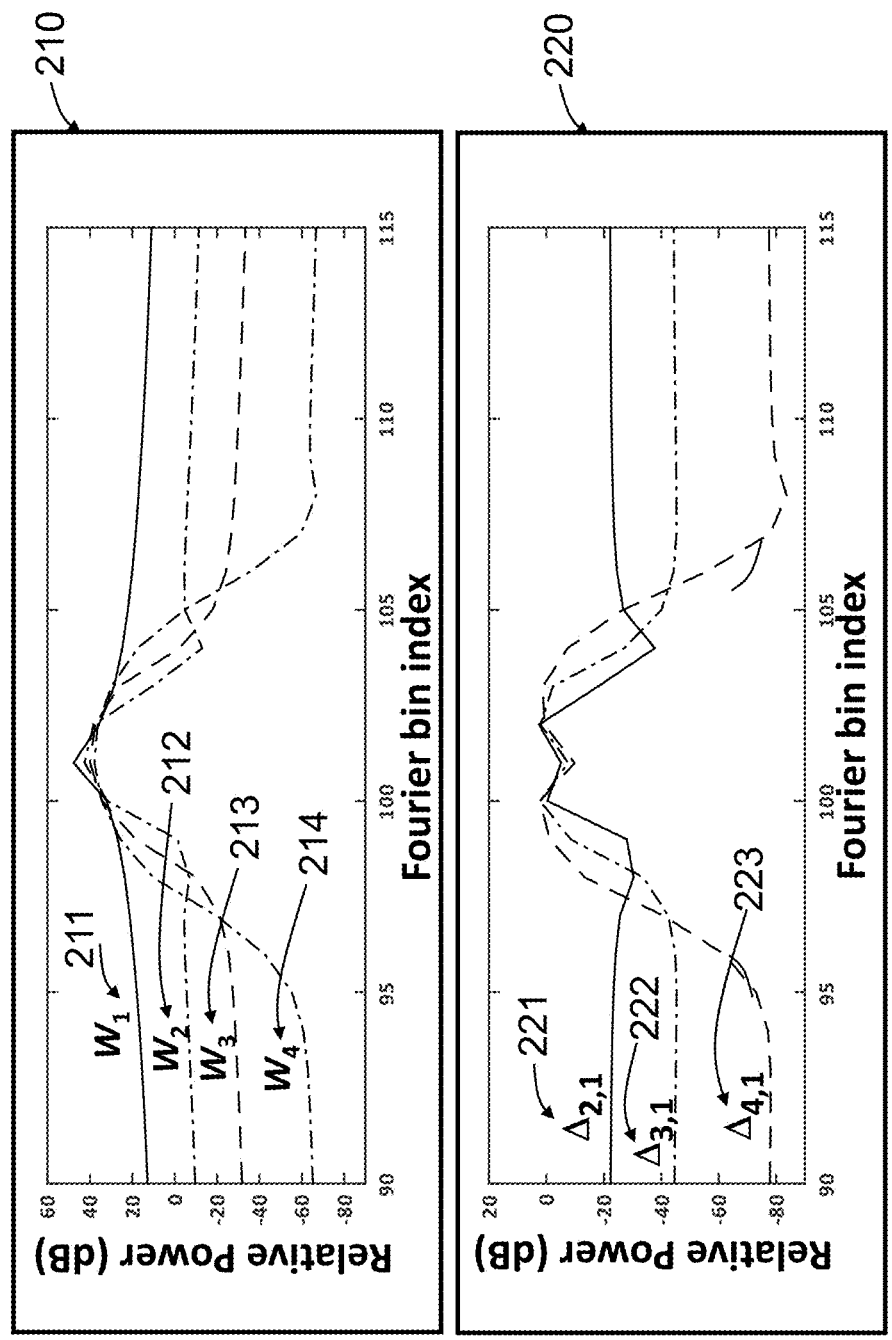
FIG. 2 are spectral domain plots of fractional apodizations and their power differences for a tone offset from the center of a spectral bin.
Figure 3:
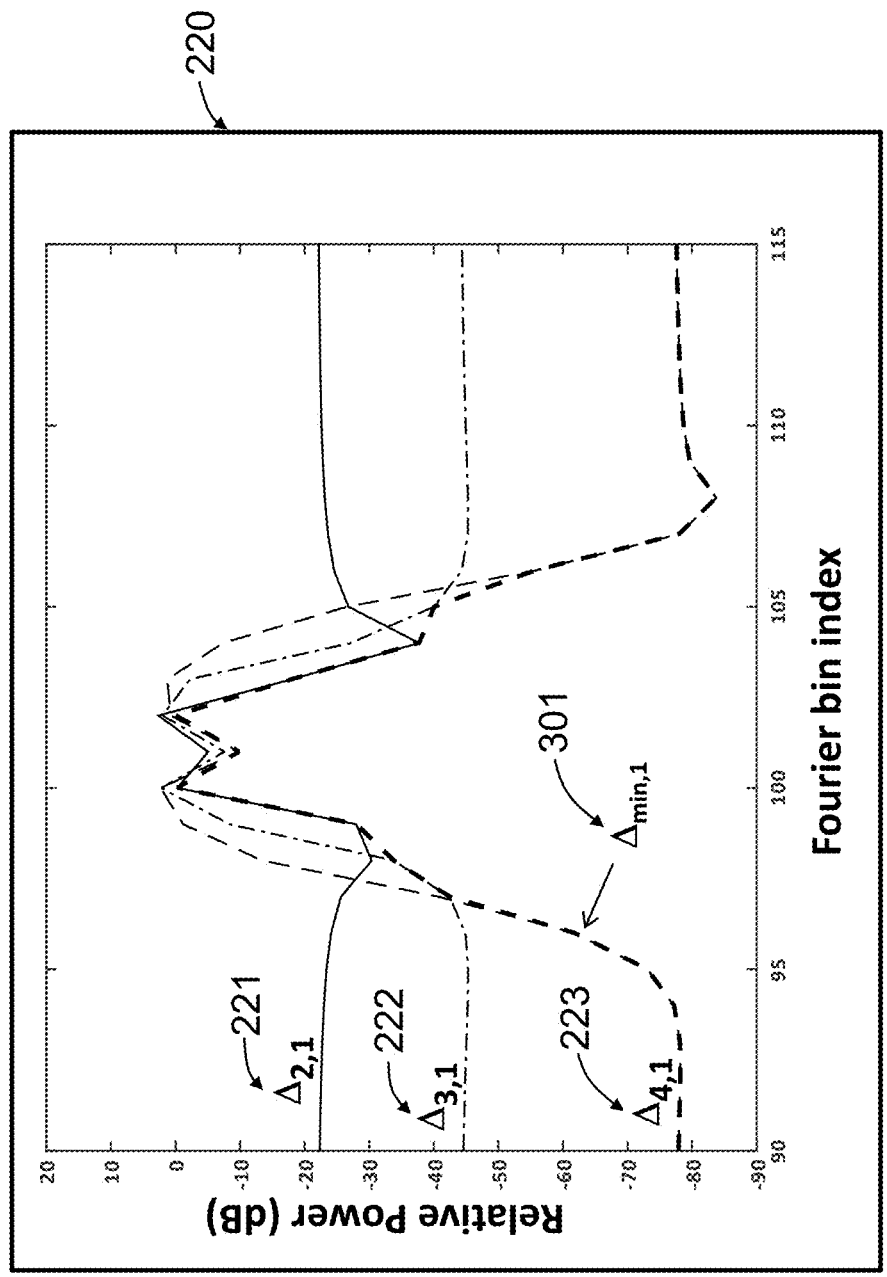
FIG. 3 is a close up view of the spectral domain plot of fractional apodizations and their power differences for a tone offset from the center of a spectral bin.

The main lobe and sidelobe responses are also a function of the location of the single tone within its resolved frequency bin. Consider the earlier example in FIG. 1, but where the tone is not centered, but fractionally offset within a Fourier bin. When the single tone is offset by 0.2 bins, the resulting spectra 210, different weights 211, 212, 213, 214, and corresponding discriminant responses 221, 222, and 223 of 220 are shown in FIG. 2. FIG. 3 is a close up the discriminant functions shown in 220 of FIG. 2 with the additional discriminant, $\Delta_{min,1}$, 301 also shown. The difference in the discriminant responses between FIG. 1 and FIG. 2 clearly indicates uncertainty in the discriminant response as a function of the uncertainty in the tone location within a single frequency resolved bin. In the general case of complex weights, it can also be shown that the uncertainty in phase of the single tone also produces uncertainty in the discriminant responses.

Figure 4:
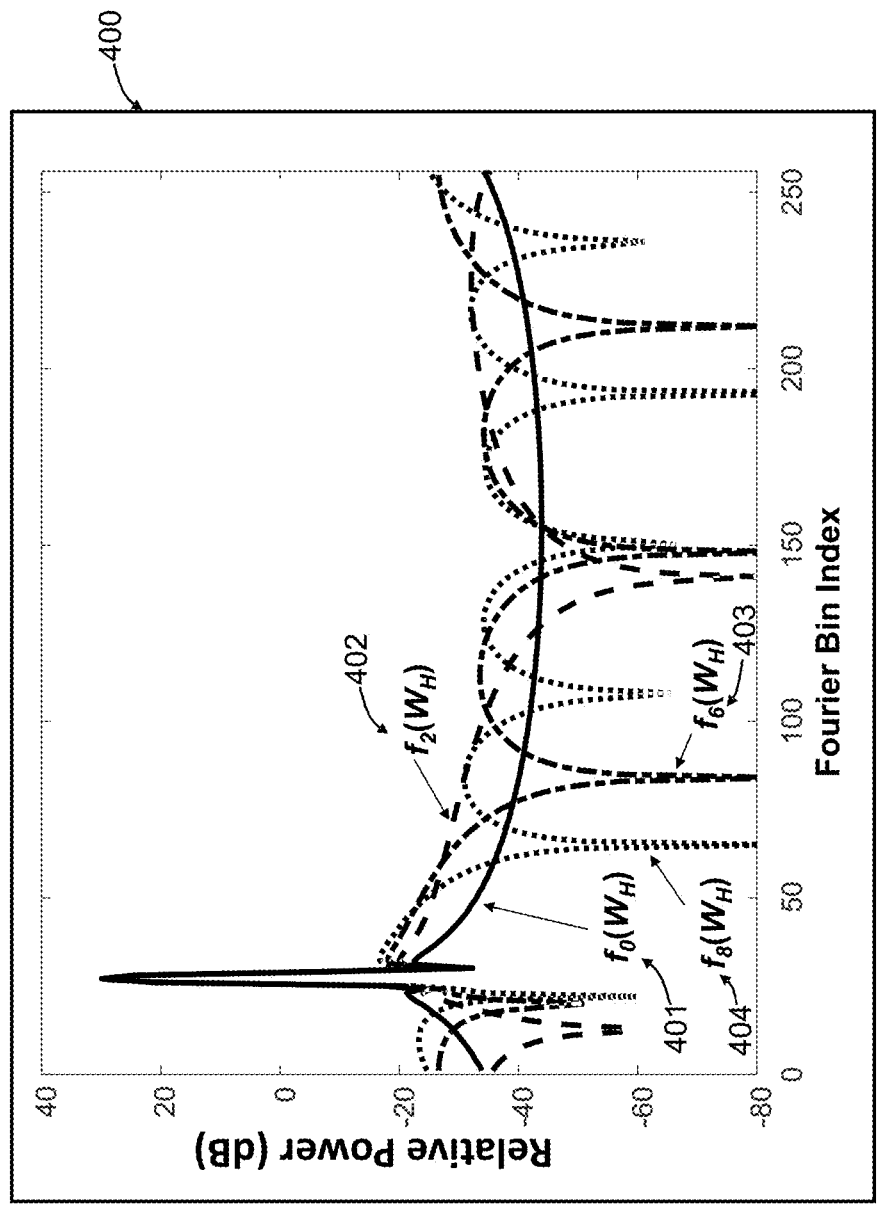
FIG. 4 are spectral domain plots of apodizations constructed from an apodization with a different number of zeros at their boundaries for a tone offset from the center of a spectral bin.

In general, there is a large class of input domain weighting functions that collectively result in ML and SL differences at the filter bin or spectral voxel-level. Let the general form $f_j(W_k)$ represent function type $f_j$, of generally complex weight $W_k$. Consider one case of real valued Hann apodization, $W_H$ which is operated on by ZFILL$_J$, ZFILL$_J(W_k)$. For this example, ZFILL$_J$ zero fills the weight by J zeroes at alternating weight boundaries and generates a Hann weight of ($N_b$-J) samples where $N_b$ is the number of the input domain samples. Some examples, $$ZFILL_0(W_H) = [W_H(N_b)] \quad (7)$$

$$ZFILL_1(W_H) = [0 W_H(N_b-1)] \quad (8)$$

$$ZFILL_2(W_H)=[0 W_H(N_b-2) 0] \quad (9)$$

$$ZFILL_3(W_H)=[0\ 0 W_H(N_b-3) 0] \quad (10)$$

$$ZFILL_4(W_H)=[0\ 0 W_H(N_b-4) 0\ 0] \quad (11)$$

where the notation $W_H(k)$ refers to a Hann weight of length k. The power spectrum 400 of FIG. 4 illustrates spectral domain differences for $ZFILL_0(W_H)=f_0(W_H)$ 401, $ZFILL_2(W_H)=f_2(W_H)$ 402, $ZFILL_6(W_H)=f_6(W_H)$ 403, and $ZFILL_8(W_H)=f_8(W_H)$ 404 for an input domain tone with 0.2 fractional bin offset, where $N_b=256$. The zero-filling operation, referred to as ZFILL hereafter, effectively shortens the Hann weight degrading the spectral resolution with marked SL power differences and smaller ML power differences across the different ZFILLs.

Summarizing, some voxel-level spectral domain discriminants are obtained by application of two or more complex valued weighting functions applied to the single look input domain data. The weighting functions are chosen so that some voxel-level statistic of the collective power spectrum measurements show differentiation between ML and SL probability distributions.

Figure 5:
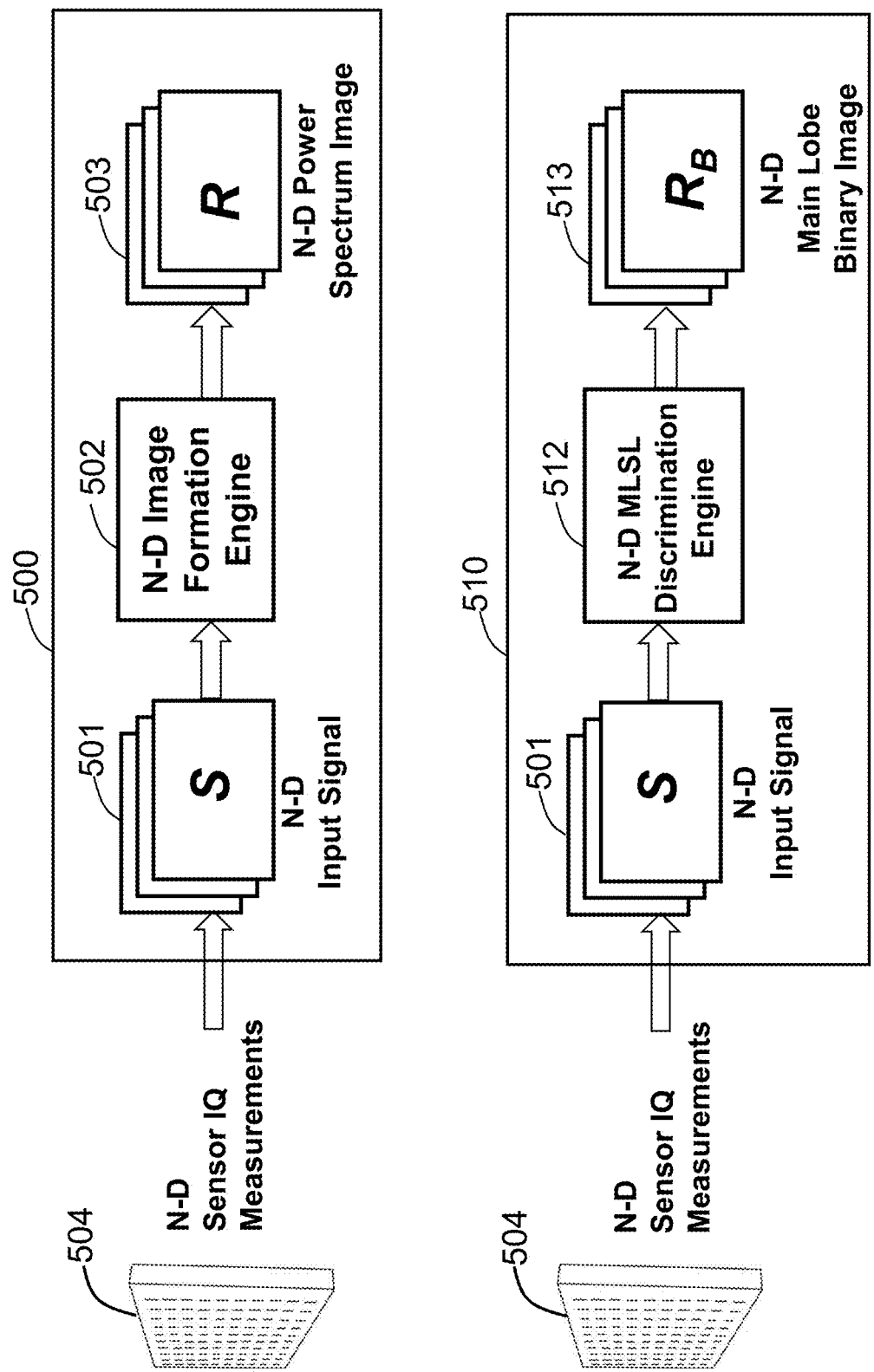
FIG. 5 is a block diagram of the first processing step to form N-dimensional spectral domain images with prior art and the main lobe side lobe discrimination processing step to produce an N-D main lobe binary image.

The first step in the prior art for spectral domain imaging is illustrated at a high level in 500 of FIG. 5. In general, a sensor, including but not limited to Sonar and Radar, produces N-dimensional data. The data is assumed to arise from signals that originate in the far field of the sensing aperture. Otherwise near-field time alignment is assumed before spectral domain imaging begins. The resulting N-D sensor in-phase and quadrature (IQ) measurements form S, the N-D input signal 501 in FIG. 5.

Figure 6:
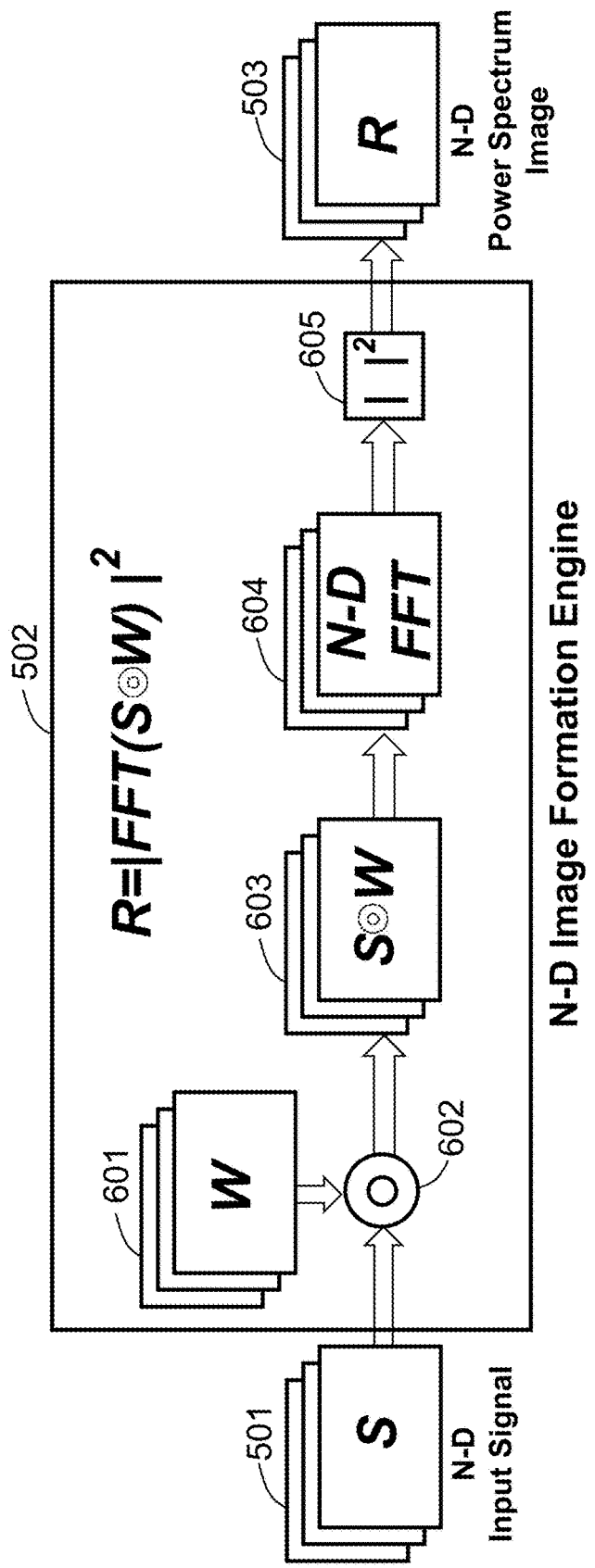
FIG. 6 is a block diagram of N-dimensional spectral domain imaging with N-dimensional apodization.

The N-D power spectrum image, $R=|FFT(S \odot W)|^2$, 503 in FIGS. 5 and 6, is obtained from the N-D image formation engine 502. First the Hadamard 602 product 603, of an N-D weight W 601, and the N-D input signal S 501 is followed by an N-D fast Fourier transform 604, followed by power detection 605 to form an N-D power spectrum image R.

In contrast to the prior art, this subject matter directly discriminates and labels main lobes and sidelobes with the MLSL discrimination engine, 512, to produce a binary N-D image, $R_B$ 513 in 510 of FIG. 5. The N-D MLSL discrimination engine is shown in more detail in FIGS. 7, 8 and 9. First multiple (>=2) non-linear perturbations of N-D images are formed, 710, followed by estimation of M statistics of Q span voxels, 720, followed by voxel binary classification 730, resulting in the N-D main lobe binary image $R_B$.

Figure 7:
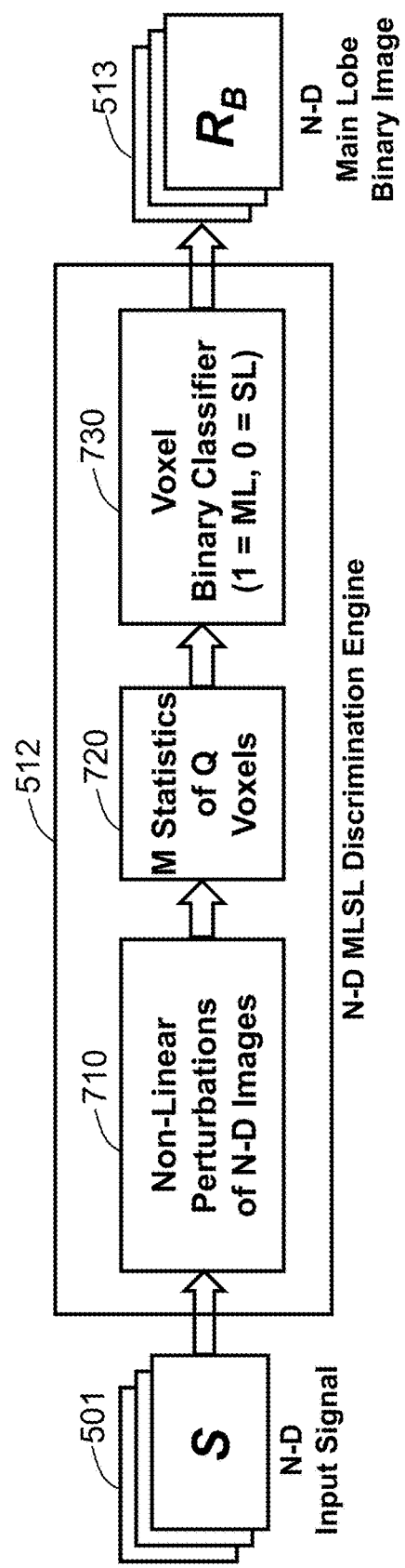
FIG. 7 is a block diagram of the N-dimensional main lobe and sidelobe discrimination engine.
Figure 8:
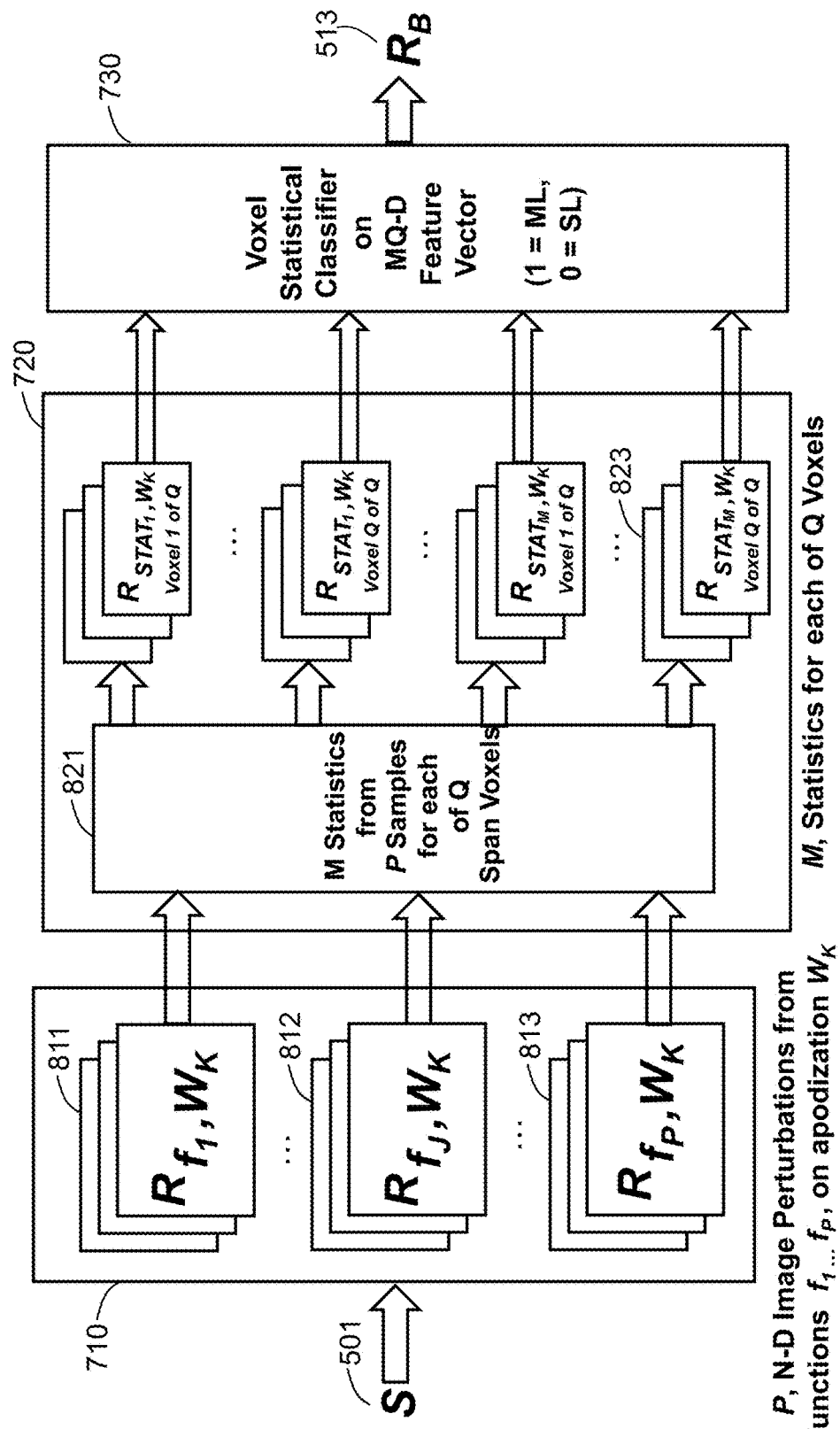
FIG. 8 is a close up view of the block diagram of the main lobe and sidelobe discrimination engine showing the image perturbations, forming statistics, and classification.

The P non-linear perturbed N-D images, $^R f_J, W_K$ 710 811 812 813, are formed as shown in FIGS. 7 and 8. The process starts with different non-linear N-D complex weighting functions $f_J(W_K)$ 901 of FIG. 9. Next the Hadamard 902 product 903, of a function of complex N-D weight, $f(W_K)$ 901, and the N-D input signal S 501 is formed, then followed by an N-D fast Fourier transform 904. The image power, $^R f_J, W_K=|FFT(S \odot f_J(W_K))|^2$ as well as complex Fourier (I,Q) coefficients 905 are returned for each N-D voxel.

Next, M statistics are calculated for each of Q voxels, 720 of FIGS. 7 and 8. Q is defined as the number of voxels in a neighborhood of voxels that surround the voxel under test plus the voxel under test itself. For clarity, a value of Q=3 in 1-D implies adjacent bins plus the center bin under test. A value of Q=9 in 2-D implies adjacent neighboring voxels plus the center bin under test. The term bin and voxel are used without distinction with regard to the number of dimensions; it is understood that bin refers of 1-D filter spectral domain filter bins, and voxel refers to general N-D spectral domain voxels.

The voxel-level statistics, 821 of FIG. 8, are chosen, during training, to maximize the separation of the ML and SL conditional probability distributions. The output of the image perturbation process results in P spectral magnitudes and Fourier coefficient phases for each voxel. Some example statistics and non-linear weights for the MLSL discrimination engine include Max-Min for P fractional weight powers, Max-Min for P ZFILL weights, standard deviation for P ZFILL weights.

The result of collecting M statistics for each voxel results in M, N-dimensional matrices, $^R STAT_M, W_K$, 823 in 720 of FIG. 8. A feature vector of MQ dimensions is presented to the voxel-level statistical classifier 730 of FIGS. 7 and 8 to test the center voxel in the neighborhood of Q voxels, for a ML or SL decision. The classifiers were trained with machine learning approaches including Parzen window density estimation and 2-layer radial basis function neural networks.

Two examples are presented. The first example describes a low cost embodiment of the MLSL discriminator when S has N=1 dimensions. The second example shows an embodiment of the MLSL discriminator when S has N=2 dimensions. For the N=1 dimension example, the performance is contrasted with main lobe discrimination obtained by prior art employing multiple apodization weights for sidelobe suppression followed by a cell averaging CFAR for local peak (main lobe) detection.

A simple implementation of the MLSL discriminator uses a limited set of 1-D feature vectors followed by sub-optimal 1-D classification. Four apodizations obtained from training data are applied, and given by equations (1-4). A limited subset of the possible discriminants are, $$\Delta_{2,1,q}=dB(F_{2,q})-dB(F_{1,q}) \quad (12)$$

$$\Delta_{4,3,q}=dB(F_{4,q})-dB(F_{3,q}) \quad (13)$$

$$\Delta_{min,q}=\min(dB(F_{1,q}),dB(F_{2,q}),dB(F_{3,q}),dB(F_{4,q})) \quad (14)$$

where q is the $q^{th}$ frequency bin.

Figure 10:
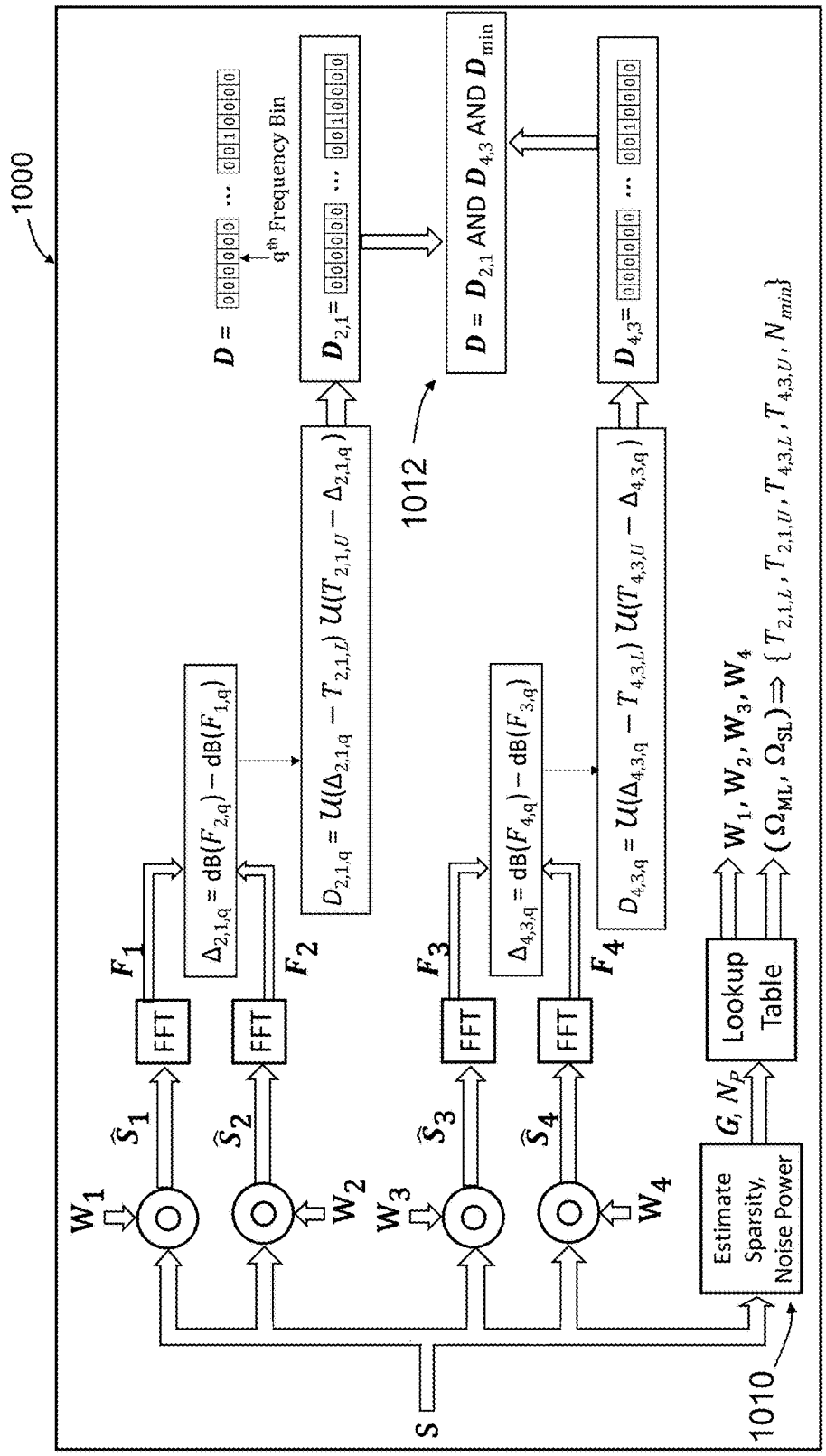
FIG. 10 is a block diagram of the signal processing to form a simplified sub-optimal main lobe and sidelobe discrimination engine for 1-dimensional data.
Figure 11:
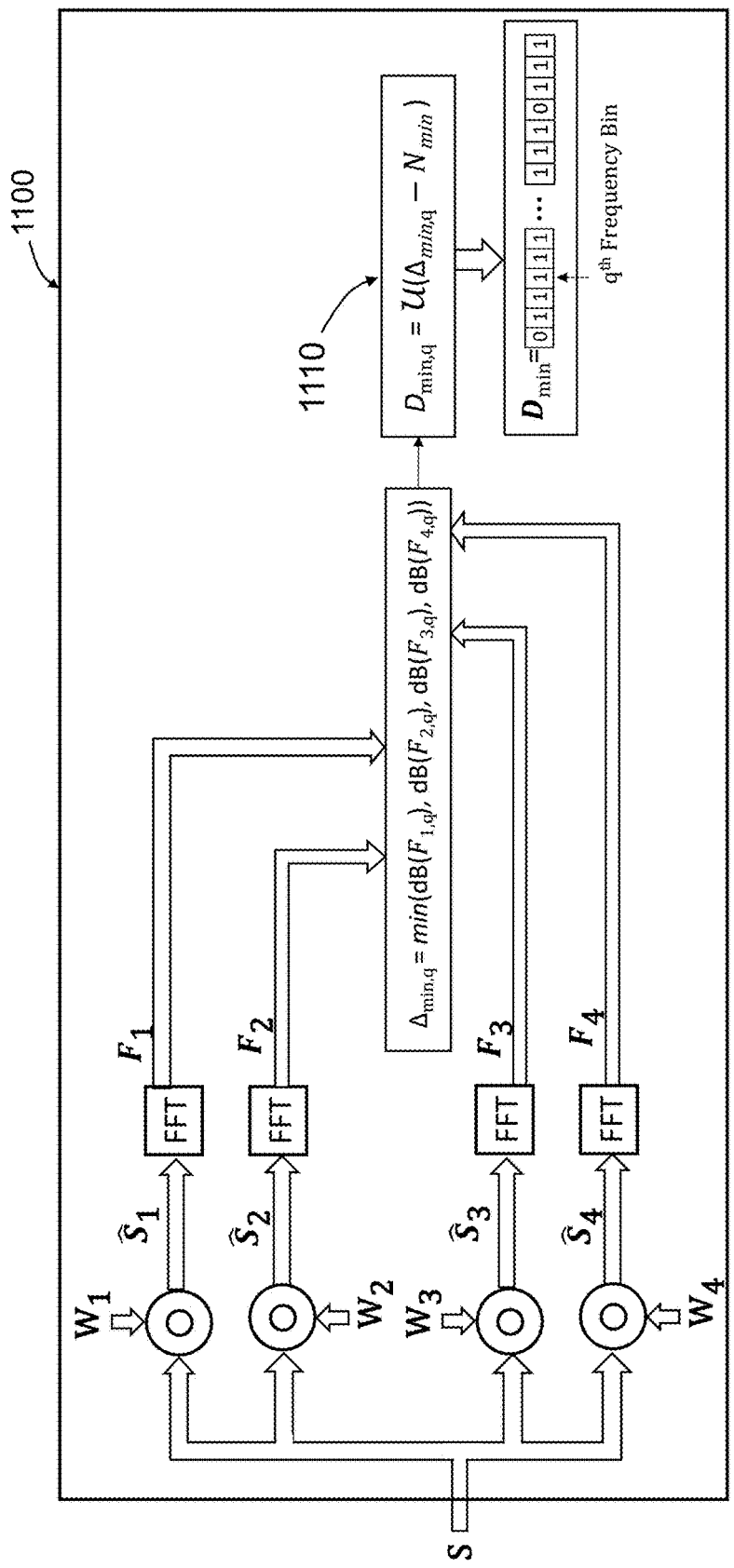
FIG. 11 is a continuation of the block diagram from FIG. 10.

Instead of forming a joint 3-D feature vector and finding the associated 3-D decision boundaries obtained from training a 3-D non-parametric classifier, a simple, yet sub-optimal, 1-D classifier is shown, 1000 and 1100 in FIGS. 10 and 11.

Referring to FIG. 10, the 1-D classification starts by evaluating the single discriminant, $\Delta_{2,1,q}$, against a lower and upper threshold pair ($T_{2,1,L}$, $T_{2,1,U}$), $$D_{2,1,q}=\mathcal{U}_{(\Delta_{2,1,q}-T_{2,1,L})}\mathcal{U}_{(T_{2,1,U}-\Delta_{2,1,q})} \quad (15)$$

where $\mathcal{U}(a)$ is the Heaviside generalized function, $\mathcal{U}(a)=1$ if a>=0, and $\mathcal{U}(a)=0$, if a<0, and ($T_{2,1,L}$, $T_{2,1,U}$) were previously learned from the training data for the observed sparsity, G, for the given S.

Similarly, for $\Delta_{4,3,q}$, a second 1-D classification is performed, $$D_{4,3,q}=\mathcal{U}_{(\Delta_{4,3,q}-T_{4,3,L})}\mathcal{U}_{(T_{4,3,U}-\Delta_{4,3,q})} \quad (16)$$

and the thresholds ($T_{4,3,L}$, $T_{4,3,U}$) were similarly obtained from training.

A third 1-D constraint requires that the minimum noise power across all the apodizations, $\Delta_{min,q}$, is greater than or equal to $N_{min}$, 1110 of FIG. 11, a noise threshold calculated from the noise power $N_p$ in S, 1010 in FIG. 10, $$D_{min,q}=\mathcal{U}_{(\Delta_{min,q}-N_{min})} \quad (17)$$

The final classification result is the logical AND of $D_{2,1}$, $D_{4,3}$, and $D_{min}$, 1012 of FIG. 10, to produce a binary vector on the frequency support where a 1 indicates the presence of a main lobe, a 0 indicates the presence of a sidelobe.

For the convenience of quantifying sparsity and scence density, let a bin gap, $B_{GAP}$, be defined as the number of filter bins between two bins contain ML signals. For clarity a $B_{GAP}=0$ implies that a ML occupies every filter bin. When $B_{GAP}=L$, there are L non-occupied filter bins between a pair of MLs. In higher dimensions, an equivalent voxel gap defines sparsity.

Figure 12:
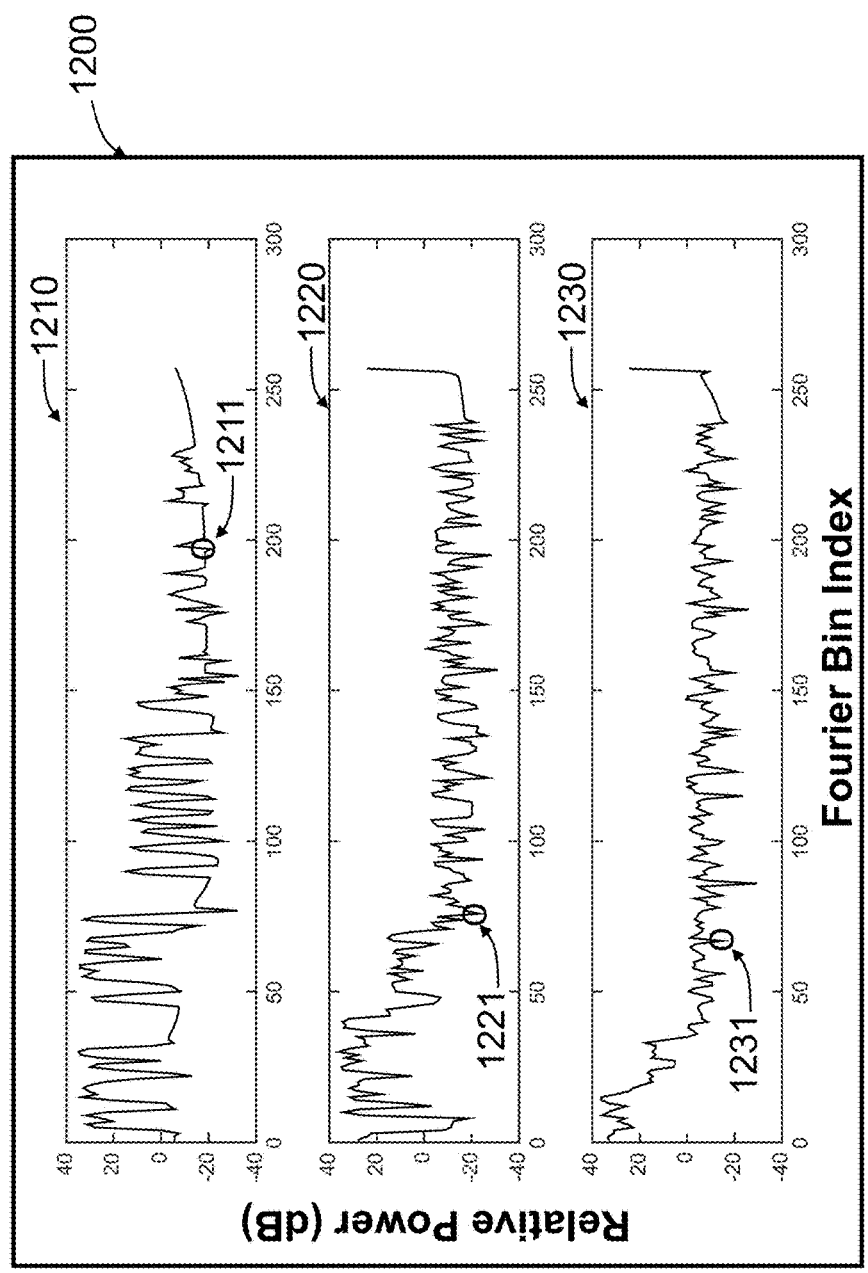
FIG. 12 are spectral domain plots for three different 1-dimensional scene densities.

Next the discriminants and classification results for data sets with variants of $B_{GAP}$ are shown in FIG. 12. Some sample spectra obtained with the nominal Hamming apodization, $H^{1.00}$, has a frequency support that spans 257 bins. The top panel, 1210 in FIG. 12, shows a medium density spectrum with 50 main lobes with an average bin gap, $E\{B_{GAP}\}=3.7$, as an estimate of relative sparsity. The middle panel, 1220, is a high-density scene with 110 main lobes with a sparsity estimate of $E\{B_{GAP}\}=1.2$. The bottom panel, 1230, is an extreme density scene with 237 main lobes and a sparsity estimate of $E\{B_{GAP}\}=0.08$ so that nearly all Fourier bins contain signals.

The challenging density of FIG. 12 is illustrated by labelling some truth. While many true signals are co-located with local peaks in the spectrum, not all peaks represent true signals. Further, some true signals are also buried in the sidelobes and are labeled as circles 1211 1221 1231 of FIG. 12.

Figure 13:
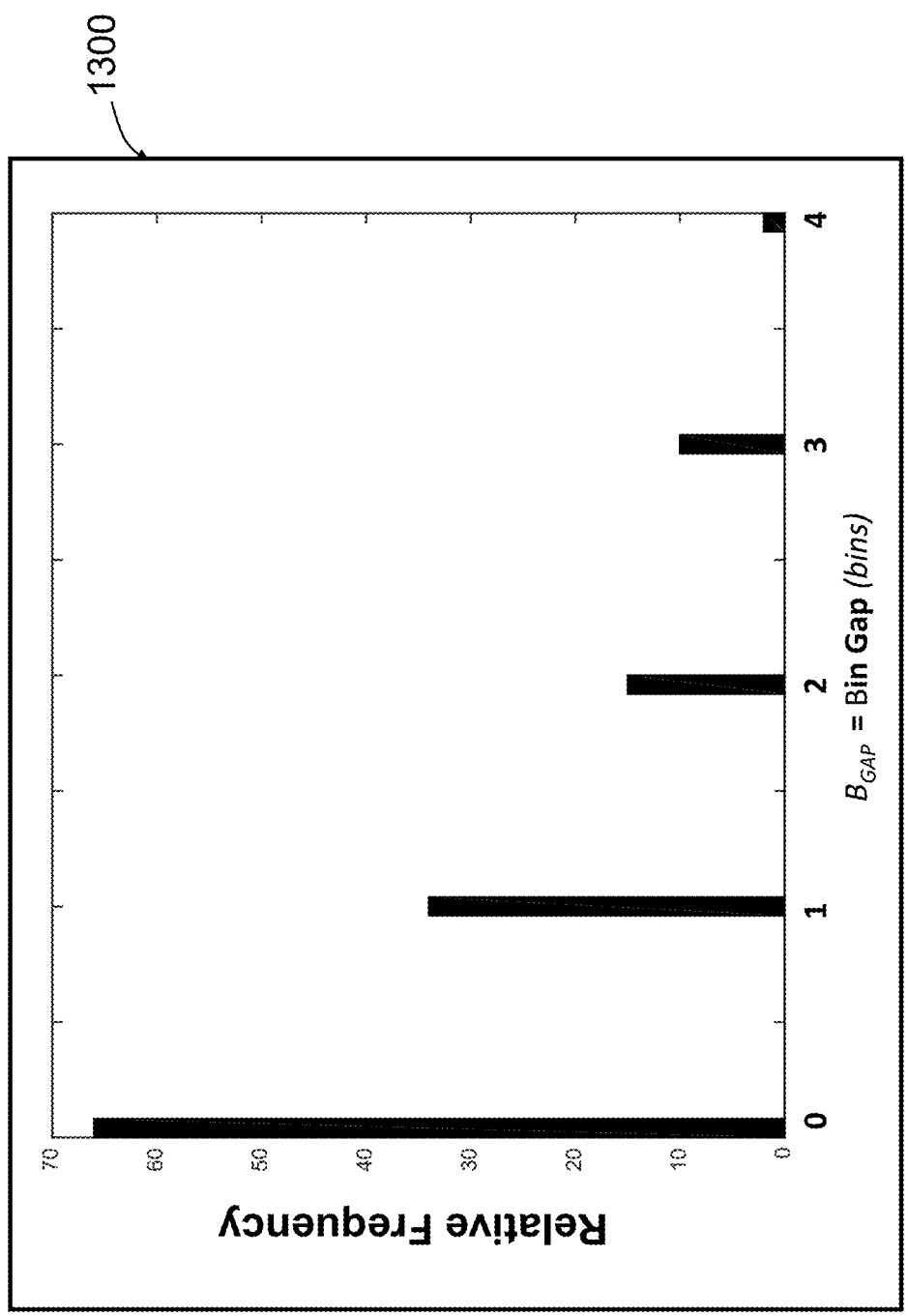
FIG. 13 is a histogram of the signal sparsity, or bin gap, for a dense 1-dimensional signal scene.

FIG. 13 is a frequency histogram of $B_{GAP}$ for a dense scene with a sparsity estimate of $E\{B_{GAP}\}=0.8$.

Figure 14:
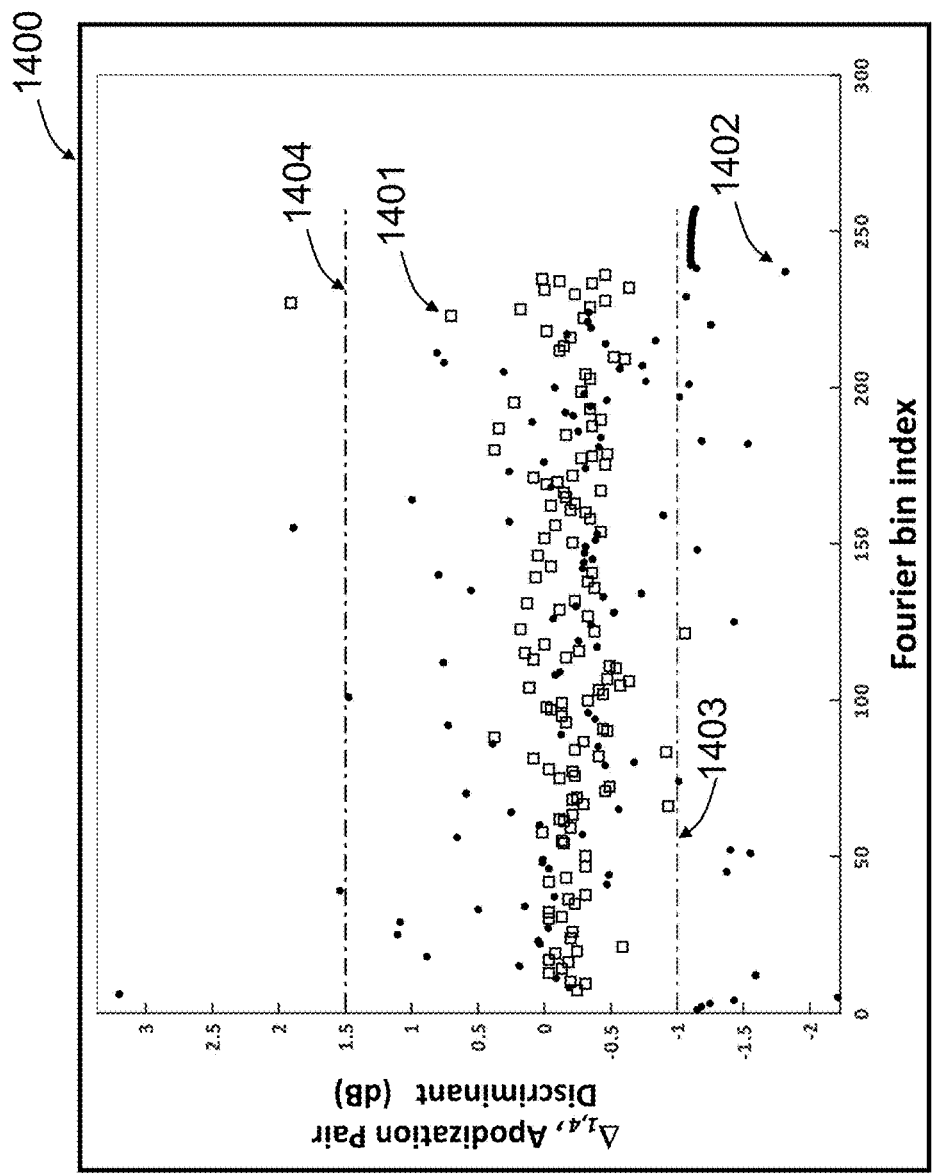
FIG. 14 is a distribution plot of one of the non-linear discriminants based on an apodization difference.
Figure 15:
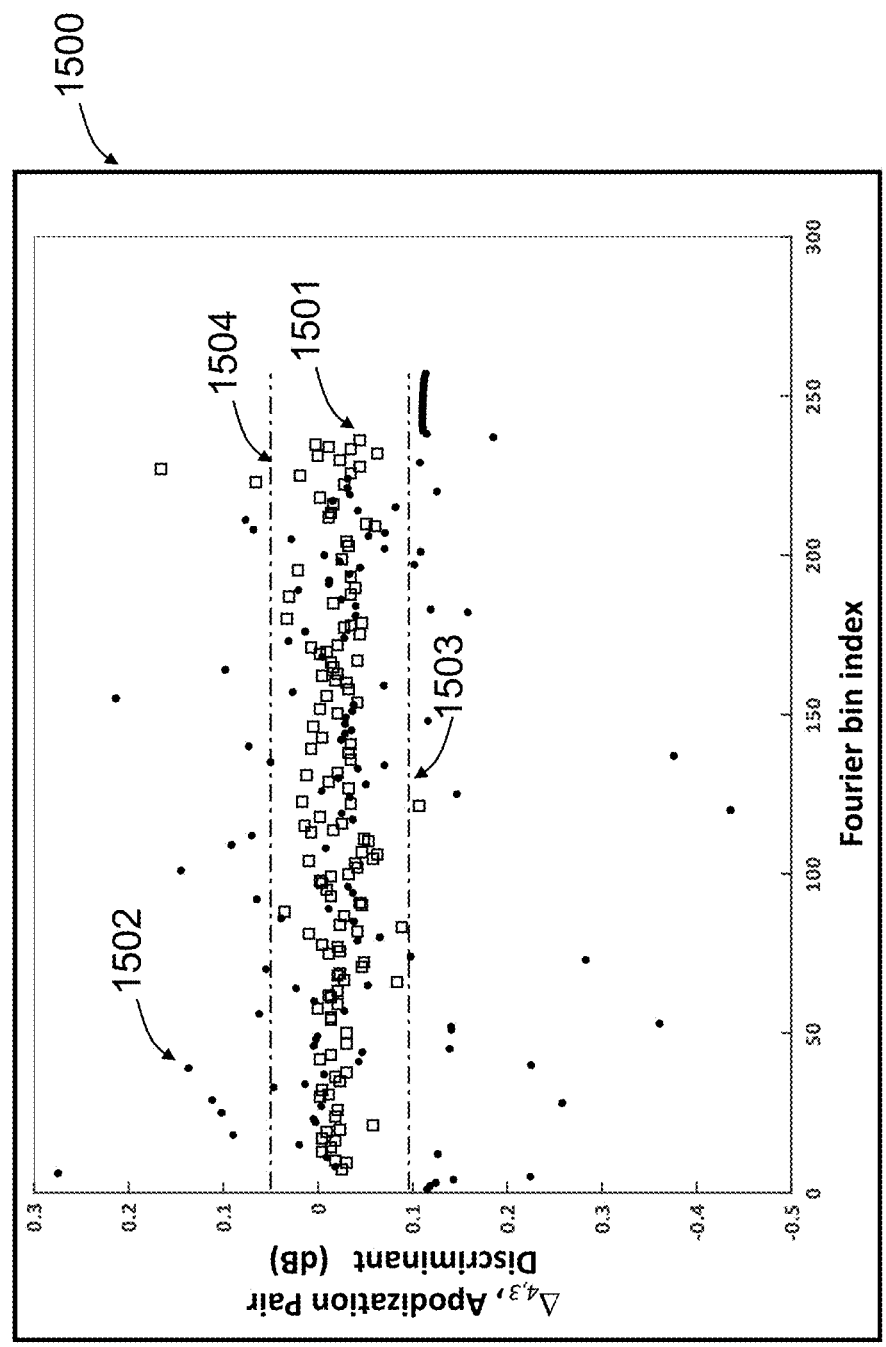
FIG. 15 is a distribution plot of a second non-linear discriminant based on an apodization difference.

The distribution of discriminants from some sample spectra for dense scene with a sparsity estimate of $E\{B_{GAP}\}=0.8$ with signal powers uniformly distributed over 47 dB dynamic range are shown in FIGS. 14 and 15. The data sets were generated from independent test data. The data was also free of thermal noise resulting in estimates of $N_{min}$ close to zero so the distribution of the $\Delta_{min}$ discriminant is omitted.

An example of the sample distribution of the $\Delta_{1,4}$ discriminant, for the first pair of apodizations, $W_1=H^{0.700}$, $W_4=H^{0.750}$, is shown in FIG. 14. MLs and SLs are labeled as squares 1401, and black dots 1402 respectively. The upper and lower decision boundaries obtained from training, $(T_{1,4,L}, T_{1,4,U})$ 1403 and 1404, pre-selected based on sparsity, G, are also shown.

Similarly, FIG. 15 shows the distribution for the discriminant, $\Delta_{4,3}$, for the second pair of apodizations, $W_3=H^{0.745}$, and $W_4=H^{0.750}$, and their respective decision boundaries $(T_{4,3,L}, T_{4,3,U})$ 1503 and 1504. MLs and SLs are labeled as squares 1501, and black dots 1502, respectively. In both FIGS. 14 and 15, the two discriminants show a reduced variance for main lobes compared to sidelobes.

Figure 16:
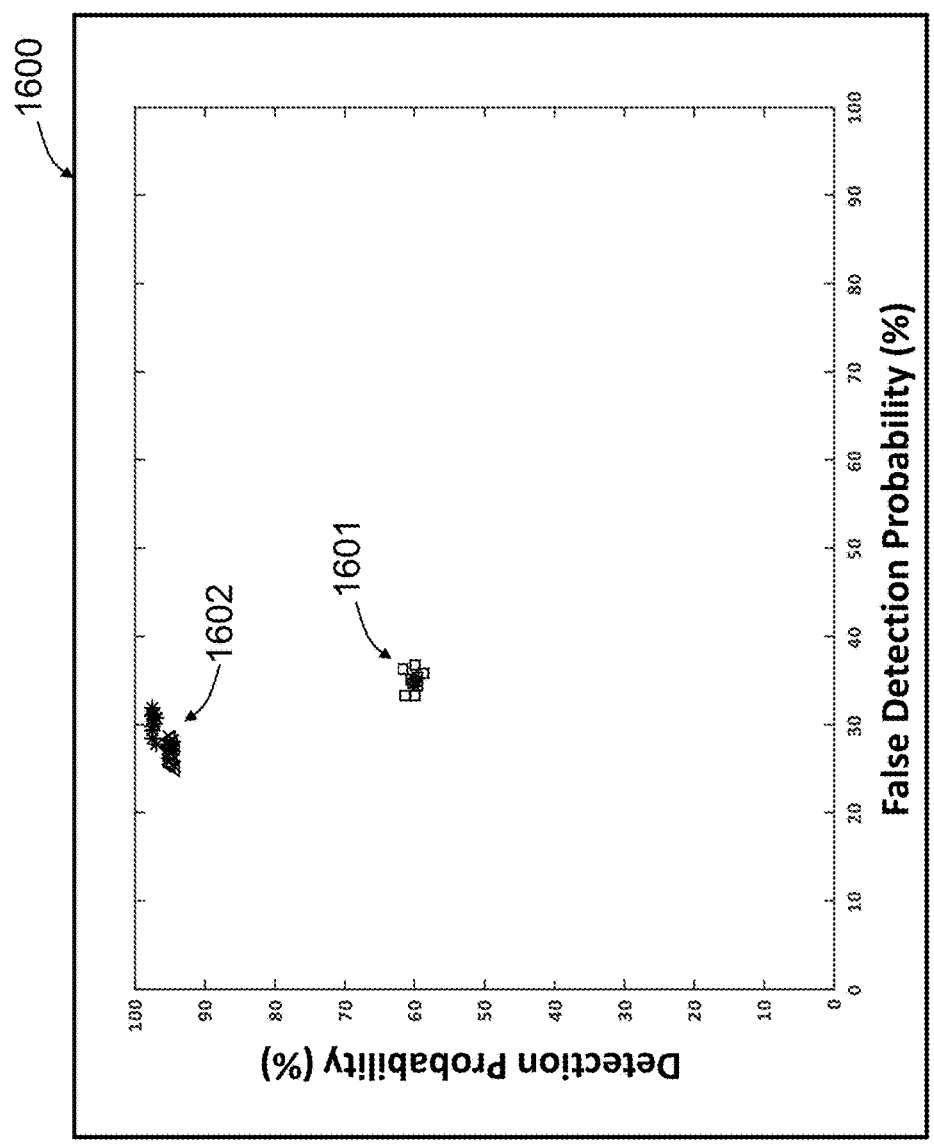
FIG. 16 is a ROC for the main lobe and sidelobe discrimination engine compared to CFAR in a dense 1-dimensional scene.

The dense scene data sets, with sparsity estimate of $E\{B_{GAP}\}=0.8$, were evaluated with both the low-cost simple MLSL discriminator of FIGS. 10 and 11 as well as a cell averaging CFAR with 6 background bins operating on spectra formed with the nominal apodization of $H^{1.00}$. The MLSL performance yielded a $\Delta P=P_d-P_{fa}=0.71$, where $P_d=0.98$ and a $P_{fa}=0.27$. In contrast the CFAR, had a $\Delta P=P_d-P_{fa}=0.36$, where $P_d=0.60$ and a $P_{fa}=0.24$. In this context, $P_d$ is the probability of a correct main lobe declaration and $P_{fa}$ is the probability of an erroneous main lobe declaration when presented with sidelobe data. The performance is summarized in the ROC plot of FIG. 16 where there are ten symbols for each discriminator. The MLSL discriminator results cluster in a group labeled as 1602, and the CFAR results cluster in the group labeled as 1601. Each symbol is the $(P_d, P_{fa})$ result from 430 independent trials. The aggregate $(P_d, P_{fa})$ values are taken across the 4300 independent trials.

Figure 17:
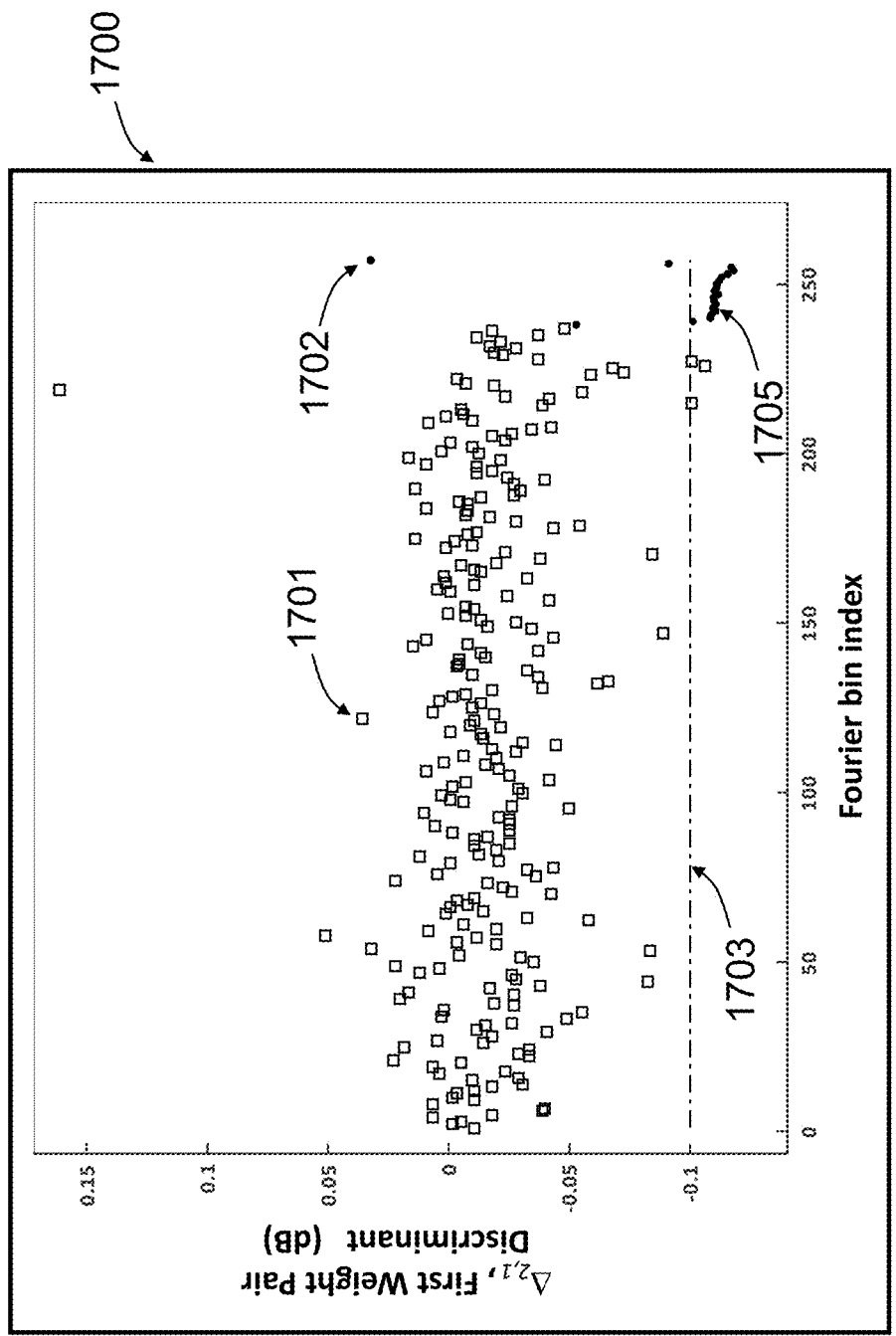
FIG. 17 is a distribution plot of one of the non-linear discriminant based on an apodization difference for a very dense 1-dimensional scene.

An extremely dense scene, with sparsity estimate of $E\{B_{GAP}\}=0.08$, was also evaluated with both discriminators. The sample distribution of the $\Delta_{2,1}$ discriminant for a single trial is shown in FIG. 17. The lower threshold, $T_{2,1,L}$, is labeled as 1703. The upper threshold, $T_{2,1,U}$ is at 0.8 and outside the plotted region. MLs and SLs are labeled as squares 1701, and black dots 1702, respectively. Notice the near ideal separability in the ML and SL distributions.

Figure 18:
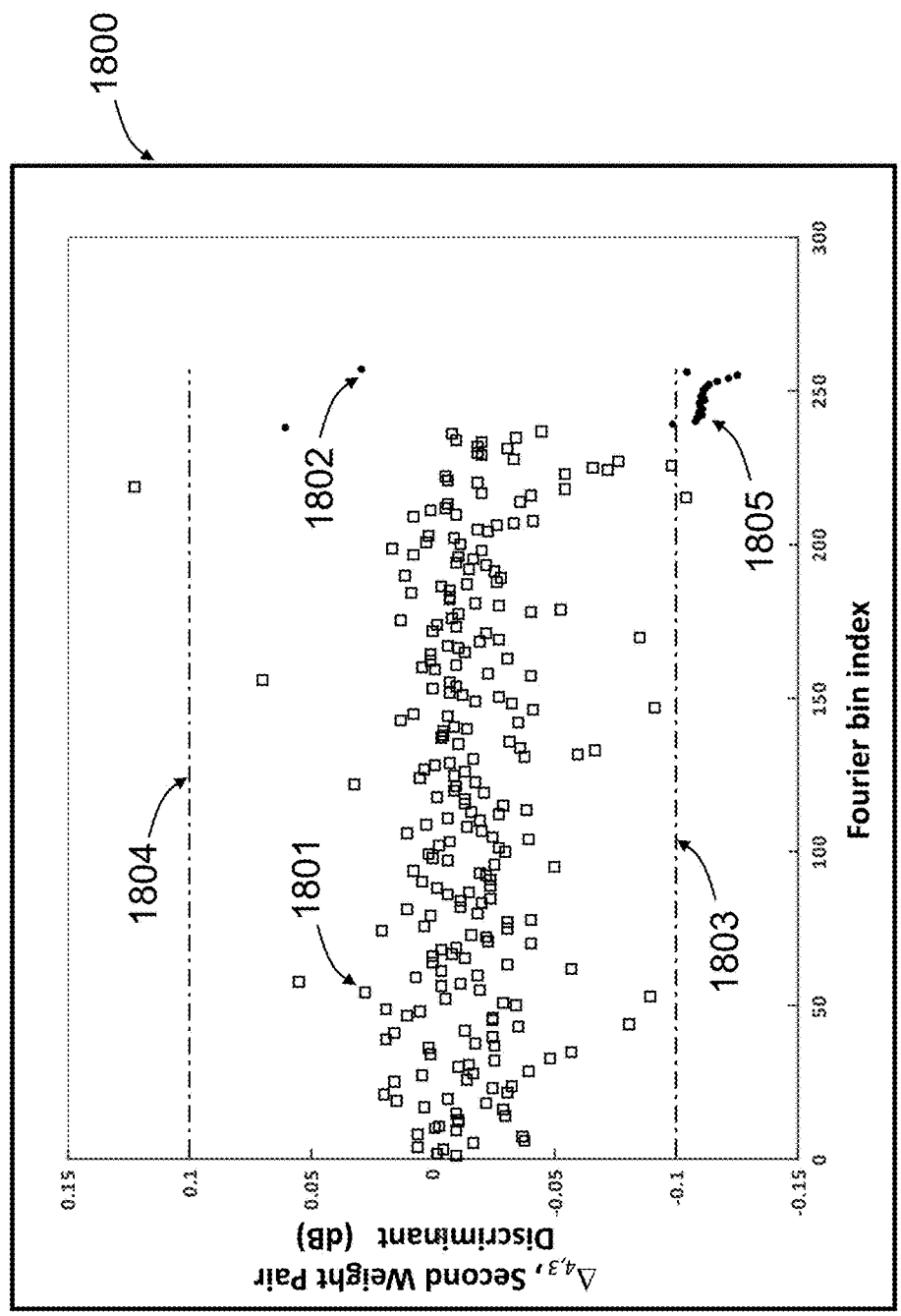
FIG. 18 is a distribution plot of a second non-linear discriminant based on an apodization difference for a very dense 1-dimensional scene.

Similarly, the sample distribution of the $\Delta_{4,3}$ discriminant for a single trial is shown in FIG. 18. The lower threshold, $T_{4,3,L}$, is labeled as 1803. The upper threshold, $T_{4,3,U}$ is labeled as 1804. MLs and SLs are labeled as squares 1801, and black dots 1802, respectively.

Figure 19:
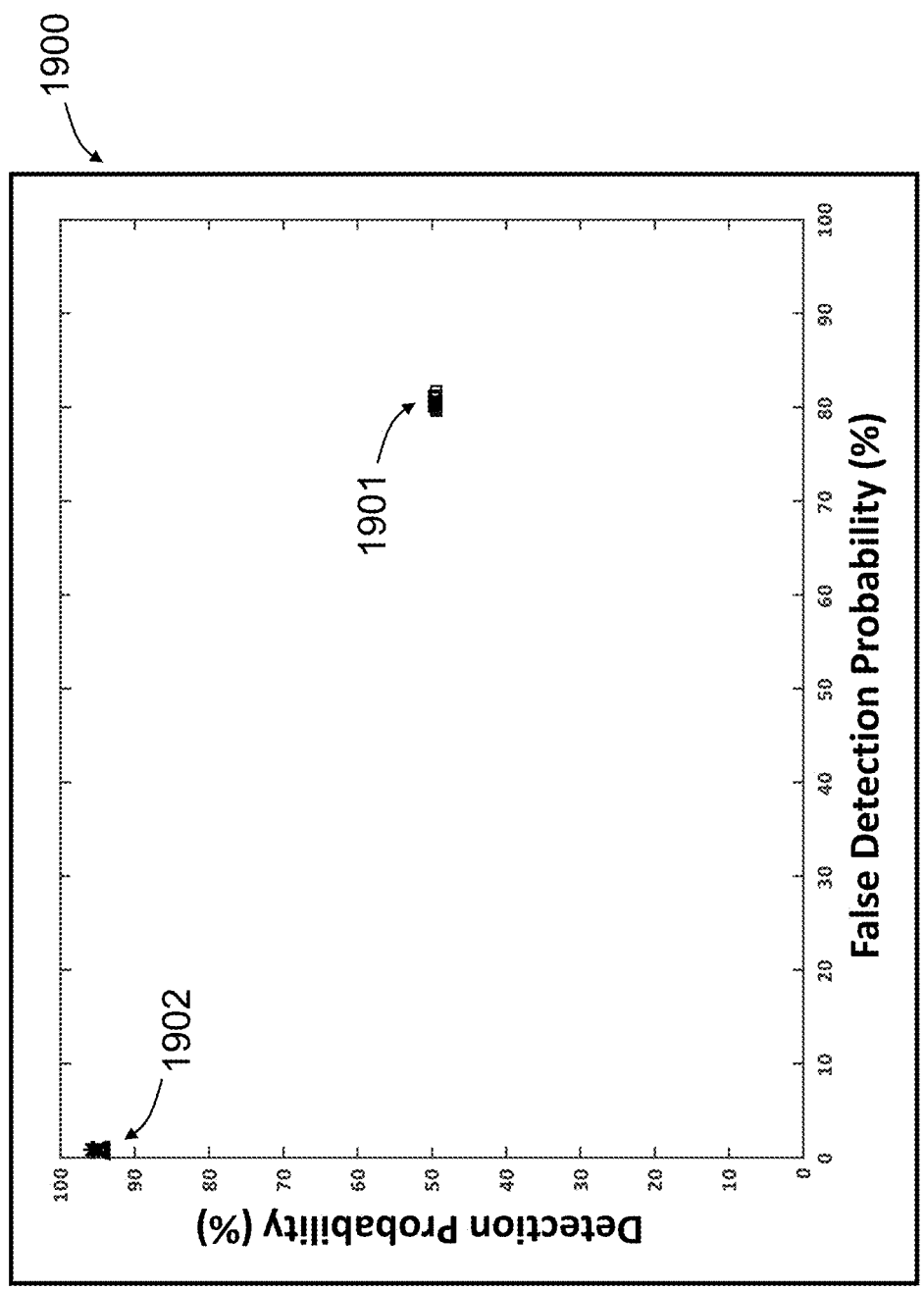
FIG. 19 is a ROC for the main lobe and sidelobe discrimination engine compared to CFAR in a very dense 1-dimensional scene.
Figure 20:
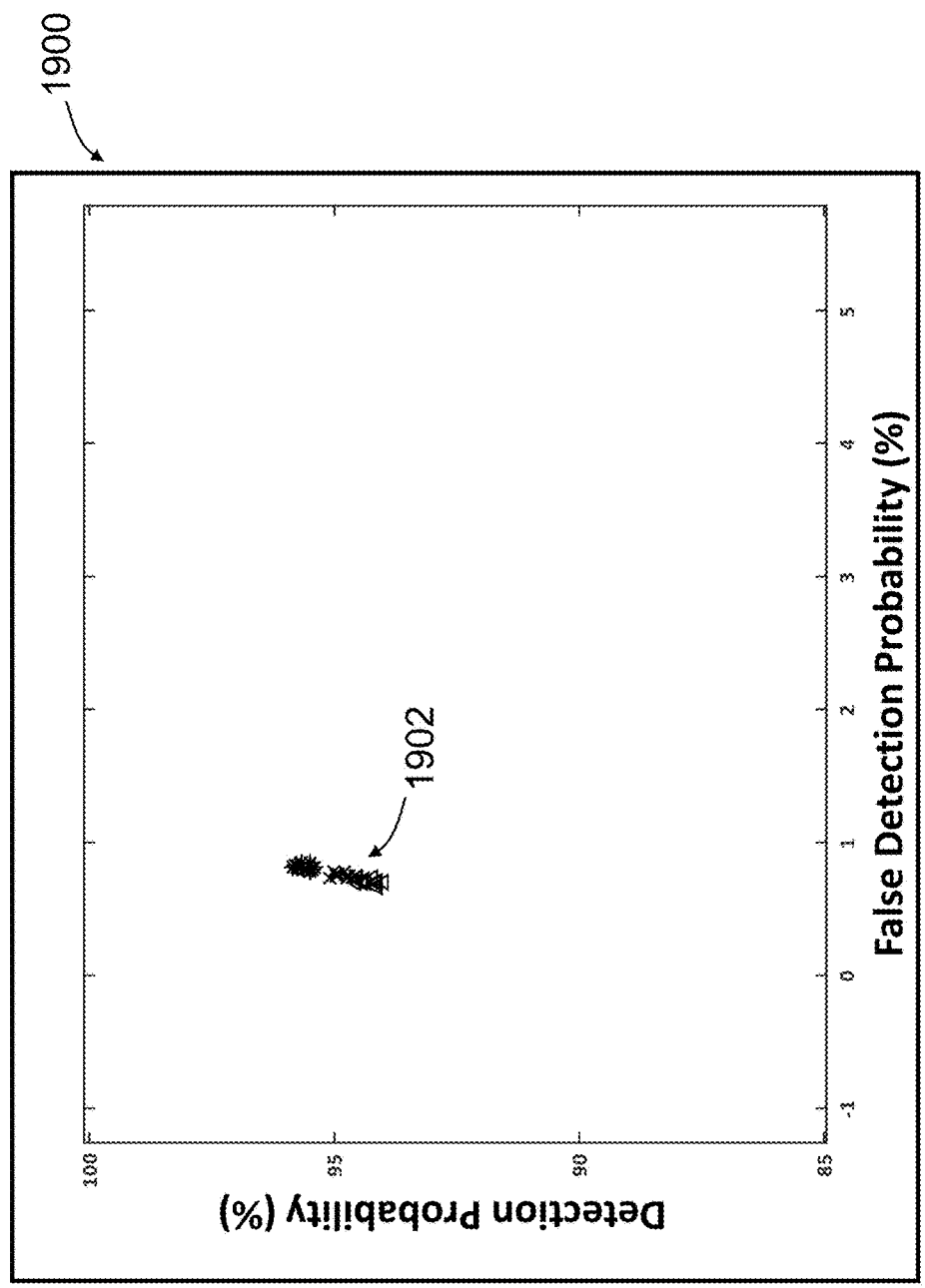
FIG. 20 is a close up of the ROC performance of the main lobe and sidelobe discrimination engine of FIG. 19.

The ROC performance comparison of both the MLSL discriminator and the cell averaging CFAR is shown in FIG. 19. The MLSL discriminator has a $\Delta P=P_d-P_{fa}=0.94$, where $P_d=0.95$ and a $P_{fa}<0.01$, while the cell averaging CFAR, with 6 background bins, had a $\Delta P=P_d-P_{fa}=-0.30$ where $P_d=0.50$ and a $P_{fa}=0.80$. There are ten symbols each for the MLSL discriminator group labeled as 1902 and the cell averaging CFAR group labeled as 1901. Each symbol is the $(P_d, P_{fa})$ result from 430 independent trials. The reported $(P_d, P_{fa})$ values are for the aggregate of 4300 independent trials. FIG. 20 is a close up of the MLSL discriminator group performance 1902.

Next, consider another cell averaging CFAR variant, denoted $CFAR_{MIN}$, which operates directly on a spectrum created by taking the bin-wise minimum across all other spectra formed with different apodizations, e.g. eqn (14), $$\Delta_{min,q}=\min(dB(F_{1,q}),dB(F_{2,q}),dB(F_{3,q}),dB(F_{4,q}))$$

This minimum spectrum enjoys suppressed sidelobes while preserving main lobe resolution which may benefit the local peak finding property of the CFAR process. Also denote $CFAR_{UNIF}$ as the cell averaging CFAR operating on a spectrum generated with a uniform apodization, e.g. $H^{0.00}$.

Figure 21:
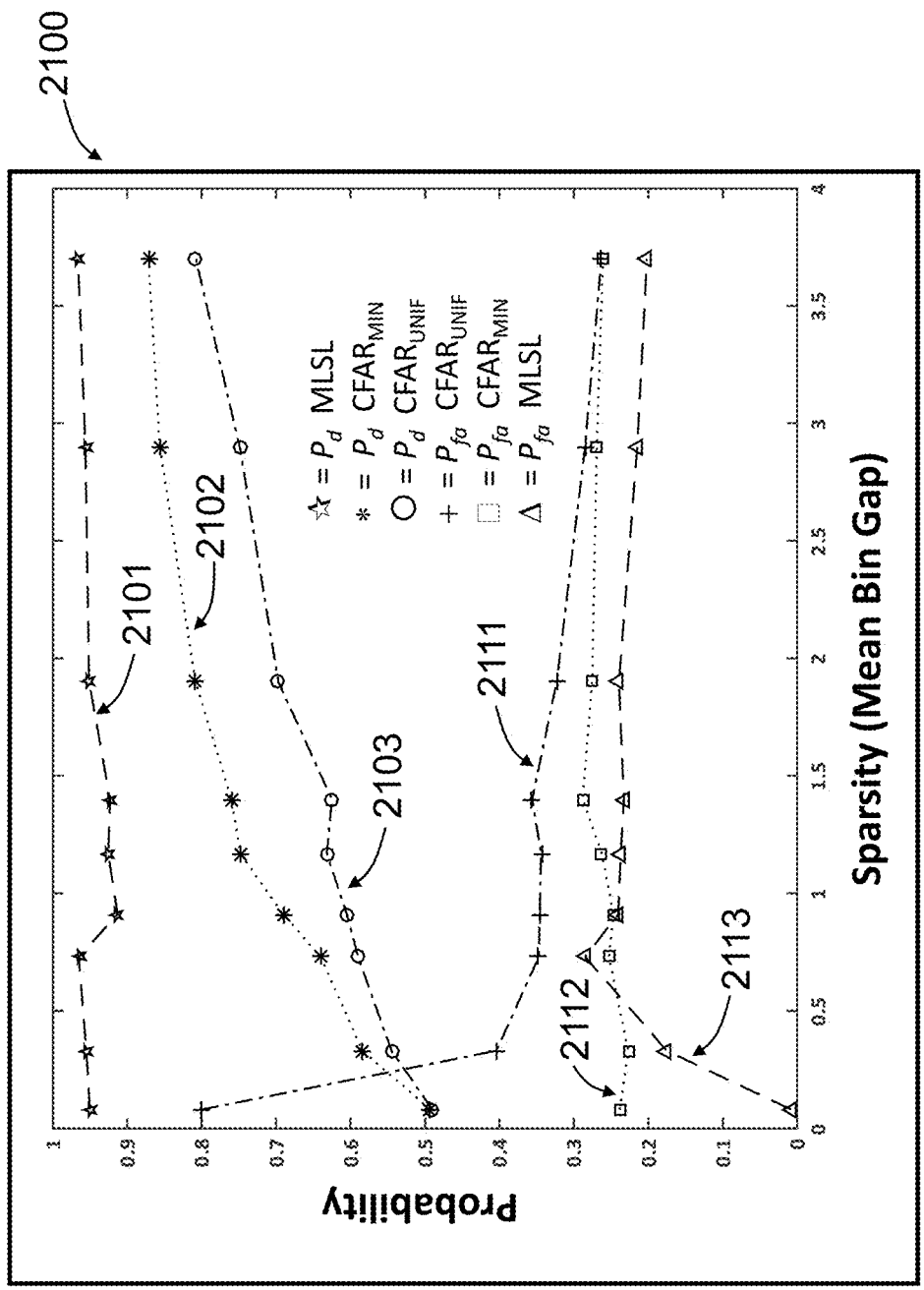
FIG. 21 is a plot of main lobe detection probability and main lobe false alarm probability with respect to scene density.

In FIG. 21, the performance of the MLSL discriminator 2101 and 2113, $CFAR_{MIN}$ 2102 and 2112, and $CFAR_{UNIF}$ 2103 and 2111 were evaluated with data sets containing different levels of sparsity varying from a mean bin gap of 0.08 to 3.75. The results shown are for 3000 independent trials at each sparsity level. For all levels of sparsity, the MLSL discriminator had significantly increased $P_d$ 2101 compared to its nearest competitor $CFAR_{MIN}$ 2102. The MLSL discriminator also enjoyed the lowest $P_{fa}$ 2113 compared to its nearest competitor $CFAR_{MIN}$ 2112 with the exception when the mean bin gap was 0.75, the $CFAR_{MIN}$ $P_{fa}$ was 0.25, and the MLSL $P_{fa}$ was 0.29. In extremely dense scenes with a mean bin gap of 0.08, the MLSL discriminator had very high performance, $P_d>0.95$ and $P_{fa}<0.01$. At the same time, the $CFAR_{MIN}$ and $CFAR_{UNIF}$ both had $P_d$ close to 0.5, with $P_{fa}=0.8$ for $CFAR_{UNIF}$, and with $P_{fa}=0.23$ for $CFAR_{MIN}$.

Figure 22:
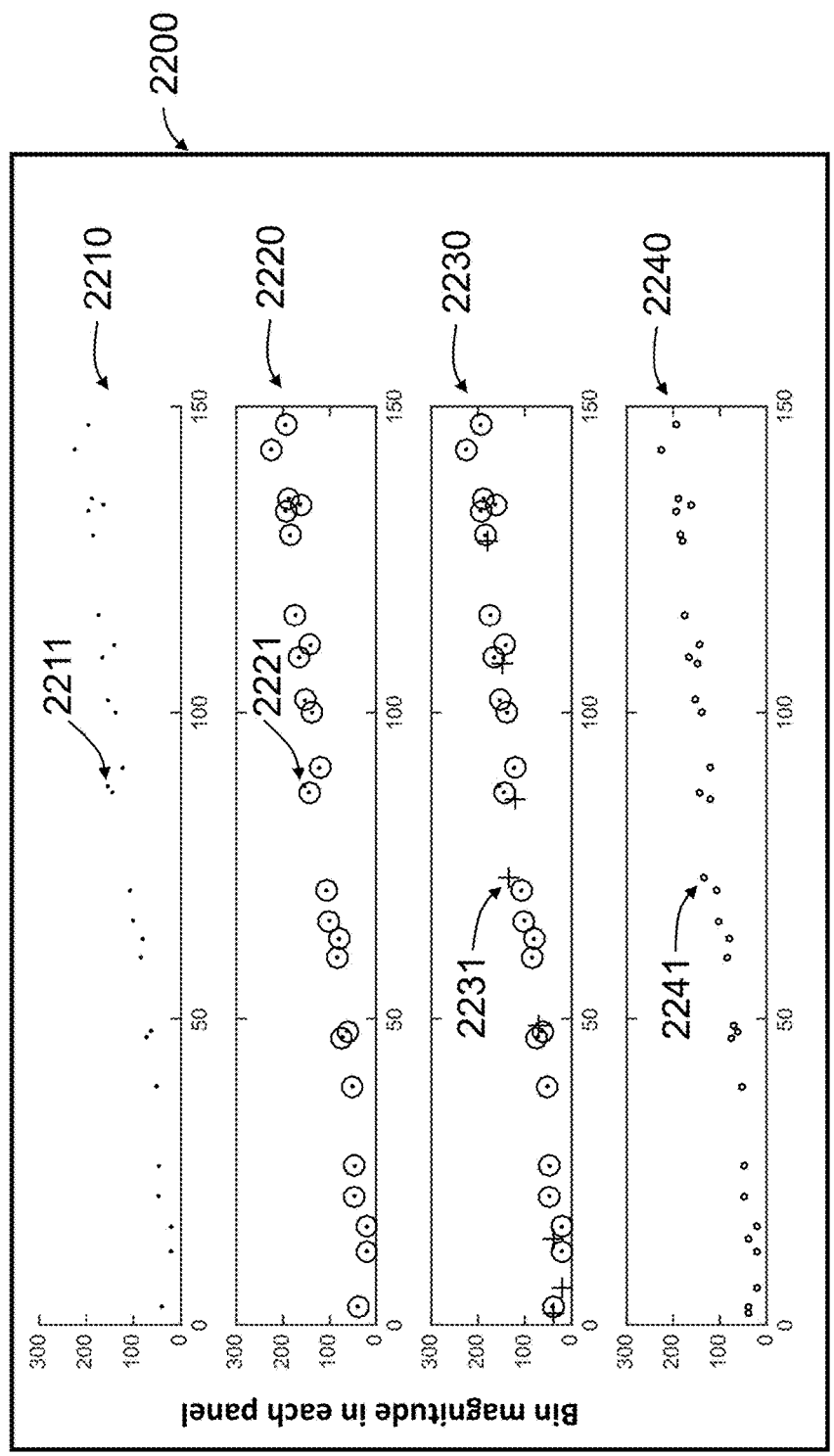
FIG. 22 is an example of the main lobe and sidelobe discrimination performance identifying all detections, main lobe detections, and false alarms in a 1-dimensional scene.

An example application of the MLSL discriminator with an RF imager observing a high-density scene is shown in the four-panels of FIG. 22. The simple image in the top plot 2210 contains just 26 true signal or main lobe bins among 150 Fourier bins. The second from top plot 2220 illustrates that the novel discriminator correctly finds 25 of the 26 bins ($P_d=96.1\%$); an arrow 2221 points to the missing bin at index 88 which corresponds to 2211 in the top panel. The third from top plot 2230 illustrates that the novel discriminator incorrectly finds 8 sidelobe bins, denoted as plus signs 2231, to be declared main lobe bins. The final discriminated image is shown as small dots in the bottom plot 2240. This represents a $P_{fa}$ of 5.3%. This image is nearly the same as the original in the top plot 2210, yet prior art typically leaves as many as several dozen sidelobes in scenes of this composition.

The next example considers a scenario for spectral domain imaging where S has N=2 dimensions. The frequency content of the first dimension is proportional to range, and the frequency content of the second dimension is proportional to spatial angle. There are 100 time samples/range bins and 50 space samples/angle bins resulting in a 5000 pixel range/angle spectral image.

The test dataset is described next. Within the 5000 pixel spectral image of range and angle, the test data set was constructed to have 410 unique (range, angle) locations arranged in the shape of the letters "RFNav", see the bottom right plot 2504 of FIG. 25. The 410 true main lobe signals were further fractionally offset in index with a uniform distribution constrained by the pixel or index boundaries. All 410 corresponding signal powers were uniformly distributed over 80 dB of dynamic range, and each had random uniformly distributed phase. The thermal noise contribution was forced to be negligible, and set at −200 dB below the peak power level of all 410 true main lobe signals. The 4590 sidelobe samples were taken from the complement of the main lobe locations.

The test dataset presents two difficulties. The first difficulty is that the pixel gap between adjacent main lobes is zero within each "RFNav" letter. In such high-density scenes, the detection probability of CFAR-like processes are compromised. The second difficulty is the high 80 dB dynamic range occupancy of the signal set. For many apodizations with narrow main lobes the high sidelobes mask the weaker signals.

The training dataset is described next. Unlike the test data, the main lobes locations were randomly located within multiple 5000 pixel range/angle spectral images with an average gap of 21.9 pixels. Otherwise the main lobes had similar random processes with random uniform pixel fractional offset, random uniformly distributed power span 80 dB of dynamic range and uniformly distributed phase. The training dataset was comprised of 1385 main lobes samples and 5565 side lobe samples.

Figure 9:
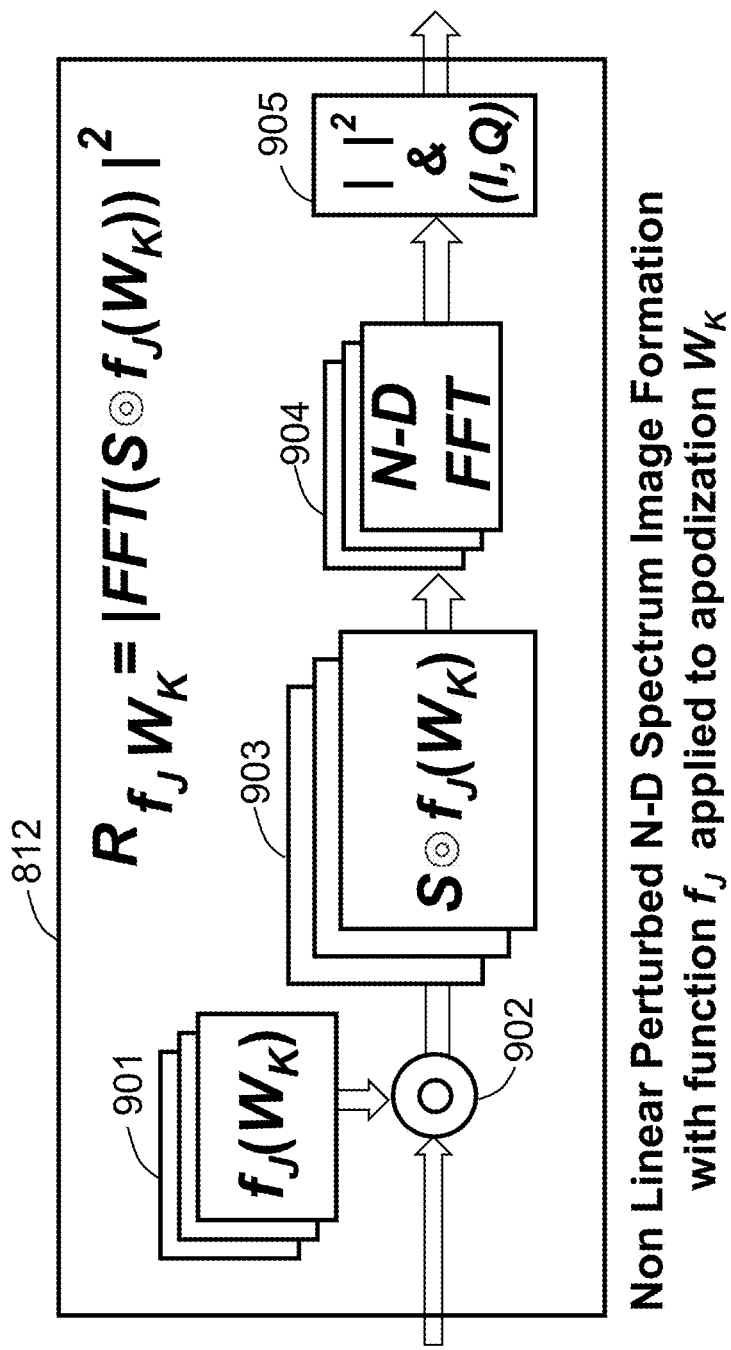
FIG. 9 is a block diagram of the signal processing to form nonlinear perturbed N-dimensional spectral images.

The MLSL discriminator design follows the general architecture of FIGS. 7-9. The non-linear image perturbations were obtained by the two non-linear functions:

$$f_{K1}(W_H) = (W_H)^{K1/10} \quad (18)$$

$$g_{K2}(W_H) = \text{ZFILL}_{K2}(W_H) \quad (19)$$

where $W_H$ represents the Hann weight, K1 is from 0 to 20, and K2 is from 0 to 9. Three statistics, M=3, are one, Max-Min for each voxel across the set of perturbations from equations 18; two, standard deviation for each voxel across the set of perturbations from equations 19, and three, Max-Min for each voxel across the set of perturbations from equations 19. The statistics were only collected on the voxel under test with no neighbors, so Q=1.

Figure 23:
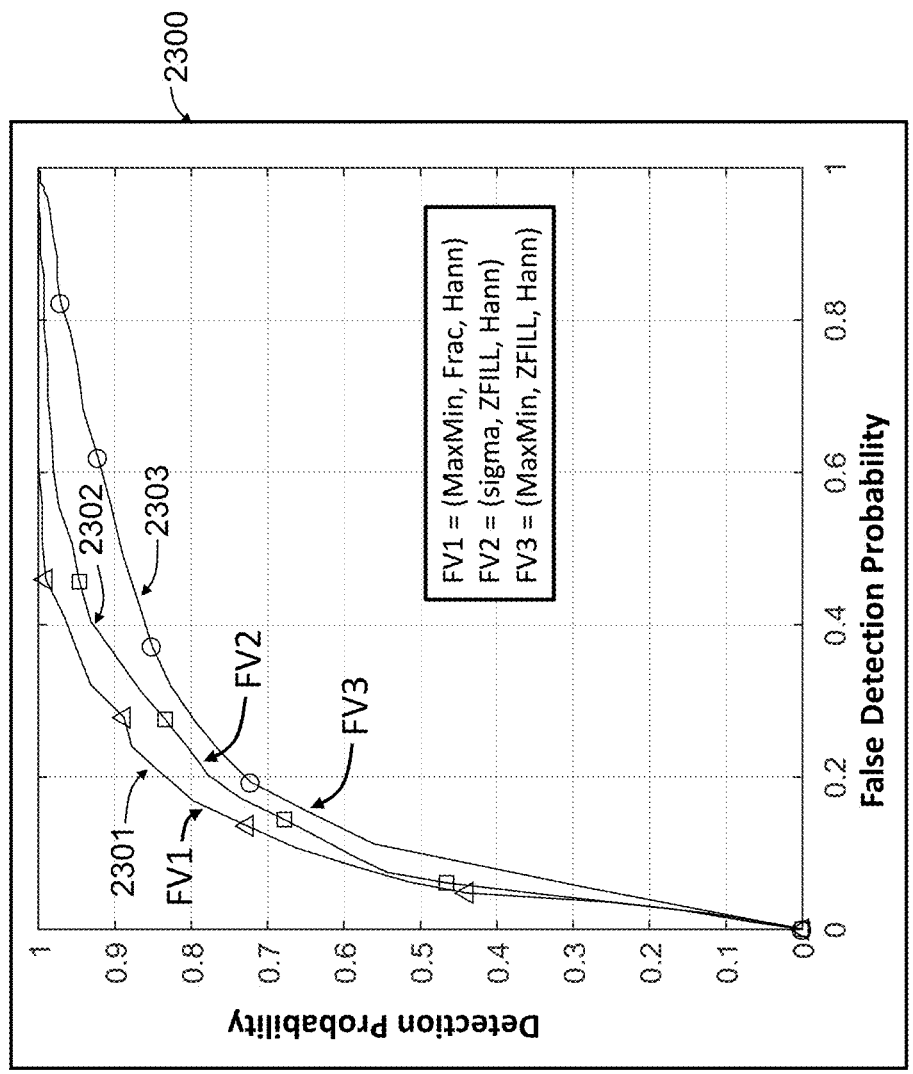
FIG. 23 is a ROC plot for three separate 1-D feature vectors performing main lobe and sidelobe discrimination in a 2-D scene.

Let the nomenclature of the three joint feature vectors that drive the non-parametric classifier be denoted as FV1= (MaxMin, Frac, Hann), FV2=(sigma, ZFILL, Hann), FV3= (MaxMin, ZFILL, Hann). Each feature vector was separately evaluated using a single threshold to assess its ML detection and SL false alarm rate on the test set. FIG. 23 contains a plot 2300 of the three feature vectors shown individually and their ROC curves 2301, 2302, and 2303.

Figure 24:
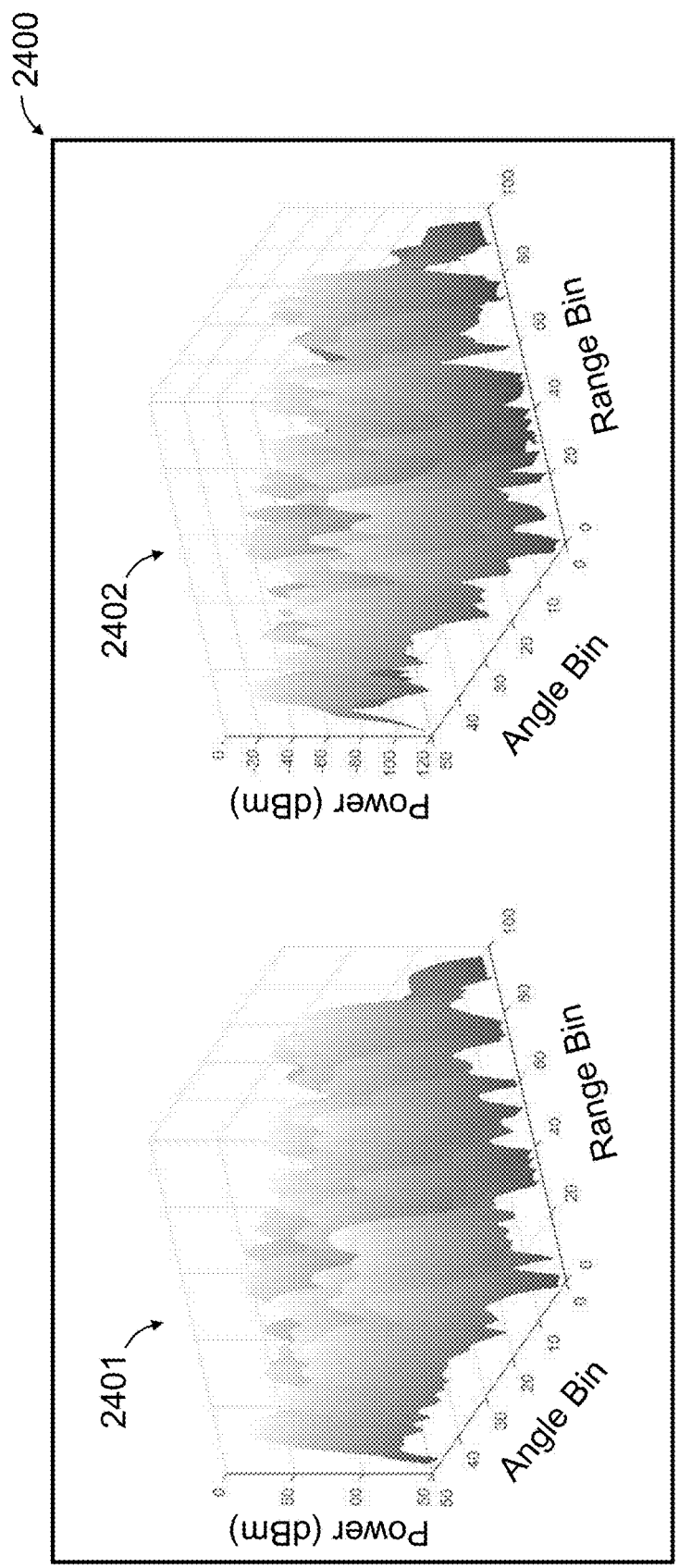
FIG. 24 shows the spectral domain plots for the Chebyshev and Hann apodizations for a scene with 80 dB dynamic range where the 2-D spectral domain truth forms the letters "RFNav".

For reference, FIG. 24, shows the resulting spectral images for the test dataset with a Chebyshev apodization with its nominal −100 dB sidelobes with a broader main lobe region 2401, as well as the test dataset with a Hann apodization with its narrower main lobe region and −31.5 dB and below sidelobes, 2402.

Dense scenes with adjacent voxels are not well suited for CFAR like processes. For reference, a simple fixed threshold was applied to the Chebyshev apodised spectral image 2401 thresholded at a constant power −97 dB below the image peak providing a 3 dB margin relative to the nominal sidelobe, 2501 of FIG. 25. Dark pixels indicate ML declared detections. Similarly, the Hann apodized spectral image was thresholded at a constant power −28.5 dB below the image peak with 3 dB sidelobe margin, 2502 of FIG. 25.

Figure 25:
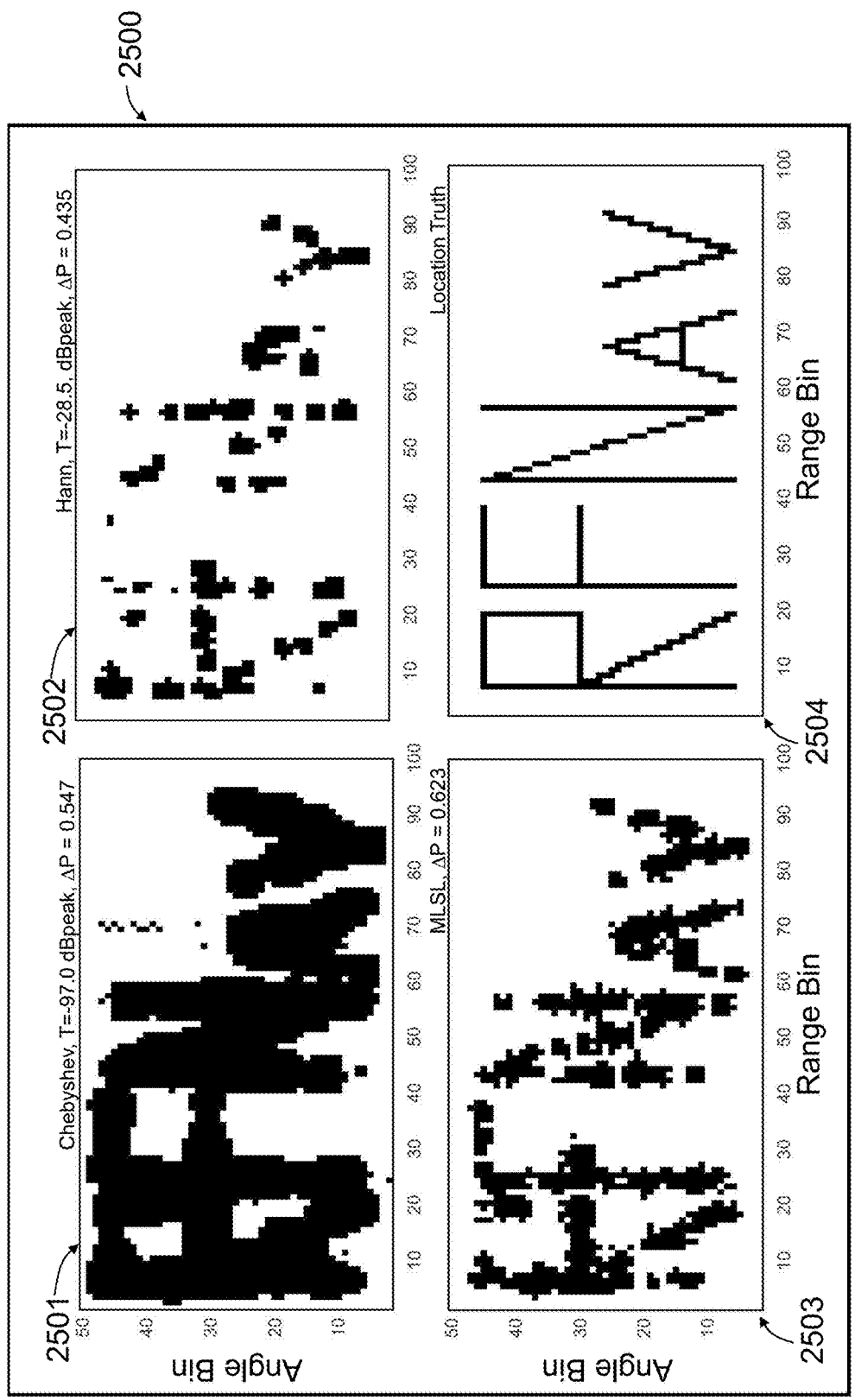
FIG. 25 shows the spectral domain positions of detected main lobes for the three cases: one, thresholded Chebyshev apodization; two, thresholded Hann apodization; and three, the main lobe sidelobe discriminator.

By contrast, the MLSL discriminator detection results, employing the three joint feature vectors, is shown in 2503 of FIG. 25. The location main lobe truth of the 80 dB dynamic range signals is shown in 2504 of FIG. 25. In contrast compare the binary detected images of the simple fixed thresholded Chebyshev 2501 and Hann 2501 spectral images with MLSL binary detected image 2503. Notice the reduced blur in the MLSL spectral image 2503 compared to the thresholded Chebyshev spectral image 2501. Also notice increased number of correctly detected pixels in the MLSL discriminator binary image 2503 compared to the Hann thresholded spectral image 2502, while both have reduced blur compared to the thresholded Chebyshev spectral image 2501.

A comparison of the ML detection probability, $P_d$, ML false alarm probability, $P_{fa}$, and $\Delta P = P_d - P_{fa}$ for the thresholded Chebyshev spectral image, the thresholded Hann spectral image, and MLSL binary image is shown in table below,

|  | $P_d$ | $P_{fa}$ | $\Delta P = P_d - P_{fa}$ |
|---|---|---|---|
| Chebyshev | 0.998 | 0.451 | 0.547 |
| Hann | 0.500 | 0.065 | 0.435 |
| MLSL | 0.785 | 0.163 | 0.623 |

The deep sidelobes of the thresholded Chebyshev apodized image allow more detection performance of the 80 dB dynamic range signals but with high false alarm rates. The thresholded Hann apodized image main lobe detection performance is reduced in high dynamic range scenes. The MLSL discrimination engine has the highest $\Delta P$ and the binary image is closer to the main lobe location truth.

Figure 26:
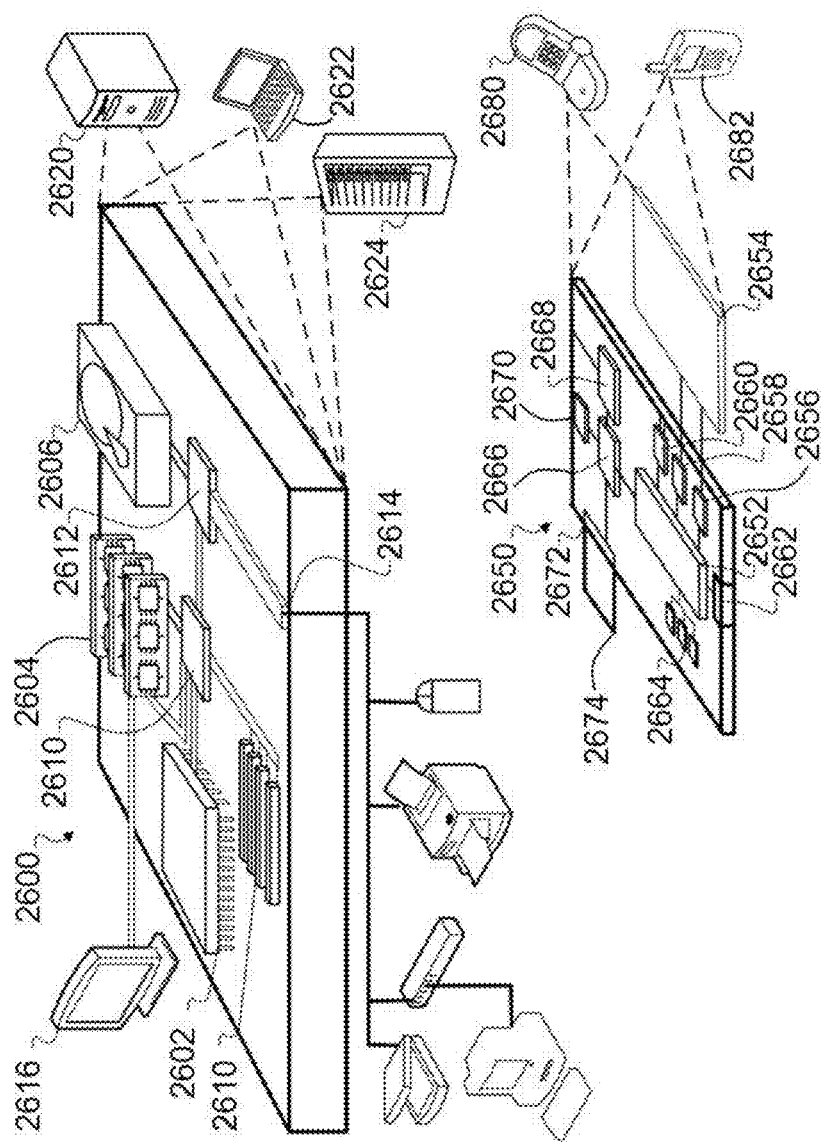
FIG. 26 is a block diagram of computing devices and systems.

FIG. 26 shows an example of example computer device 2600 and example mobile computer device 2650, which can be used to implement the techniques described herein. For example, a portion or all of the operations of the MLSL discriminator may be executed by the computer device 2600 and/or the mobile computer device 2650. Computing device 2600 is intended to represent various forms of digital computers, including, e.g., laptops, desktops, workstations, personal digital assistants, servers, blade servers, mainframes, and other appropriate computers. Computing device 2650 is intended to represent various forms of mobile devices, including, e.g., personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 2600 includes processor 2602, memory 2604, storage device 2606, high-speed interface 2608 connecting to memory 2604 and high-speed expansion ports 2610, and low speed interface 2612 connecting to low speed bus 2614 and storage device 2606. Each of components 2602, 2604, 2606, 2608, 2610, and 2612, are interconnected using various busses, and can be mounted on a common motherboard or in other manners as appropriate. Processor 2602 can process instructions for execution within computing device 2600, including instructions stored in memory 2604 or on storage device 2606 to display graphical data for a GUI on an external input/output device, including, e.g., display 2616 coupled to high speed interface 2608. In other implementations, multiple processors and/or multiple buses can be used, as appropriate, along with multiple memories and types of memory. Also, multiple computing devices 2600 can be connected, with each device providing portions of the necessary operations (e.g., as a server bank, a group of blade servers, or a multi-processor system).

Memory 2604 stores data within computing device 2600. In one implementation, memory 2604 is a volatile memory unit or units. In another implementation, memory 2604 is a non-volatile memory unit or units. Memory 2604 also can be another form of computer-readable medium, including, e.g., a magnetic or optical disk.

Storage device 2606 is capable of providing mass storage for computing device 2600. In one implementation, storage device 2606 can be or contain a computer-readable medium, including, e.g., a floppy disk device, a hard disk device, an optical disk device, or a tape device, a flash memory or other similar solid state memory device, or an array of devices, including devices in a storage area network or other configurations. A computer program product can be tangibly embodied in a data carrier. The computer program product also can contain instructions that, when executed, perform one or more methods, including, e.g., those described above. The data carrier is a computer- or machine-readable medium, including, e.g., memory 2604, storage device 2606, memory on processor 2602, and the like.

High-speed controller 2608 manages bandwidth-intensive operations for computing device 2600, while low speed controller 2612 manages lower bandwidth-intensive operations. Such allocation of functions is an example only. In one implementation, high-speed controller 2608 is coupled to memory 2604, display 2616 (e.g., through a graphics processor or accelerator), and to high-speed expansion ports 2610, which can accept various expansion cards (not shown). In the implementation, low-speed controller 2612 is coupled to storage device 2606 and low-speed expansion port 2614. The low-speed expansion port, which can include various communication ports (e.g., USB, Bluetooth®, Ethernet, wireless Ethernet), can be coupled to one or more input/output devices, including, e.g., a keyboard, a pointing device, a scanner, or a networking device including, e.g., a switch or router, e.g., through a network adapter.

Computing device 2600 can be implemented in a number of different forms, as shown in the figure. For example, it can be implemented as standard server 2620, or multiple times in a group of such servers. It also can be implemented as part of rack server system 2624. In addition, or as an alternative, it can be implemented in a personal computer including, e.g., laptop computer 2622. In some examples, components from computing device 2600 can be combined with other components in a mobile device (not shown), including, e.g., device 2650. Each of such devices can contain one or more of computing device 2600, 2650, and an entire system can be made up of multiple computing devices 2600, 2650 communicating with each other.

Computing device 2650 includes processor 2652, memory 2664, an input/output device including, e.g., display 2654, communication interface 2666, and transceiver 2668, among other components. Device 2650 also can be provided with a storage device, including, e.g., a microdrive or other device, to provide additional storage. Each of components 2650, 2652, 2664, 2654, 2666, and 2668, are interconnected using various buses, and several of the components can be mounted on a common motherboard or in other manners as appropriate.

Processor 2652 can execute instructions within computing device 2650, including instructions stored in memory 2664. The processor can be implemented as a chipset of chips that include separate and multiple analog and digital processors. The processor can provide, for example, for coordination of the other components of device 2650, including, e.g., control of user interfaces, applications run by device 2650, and wireless communication by device 2650.

Processor 2652 can communicate with a user through control interface 2658 and display interface 2656 coupled to display 2654. Display 2654 can be, for example, a TFT LCD (Thin-Film-Transistor Liquid Crystal Display) or an OLED (Organic Light Emitting Diode) display, or other appropriate display technology. Display interface 2656 can comprise appropriate circuitry for driving display 2654 to present graphical and other data to a user. Control interface 2658 can receive commands from a user and convert them for submission to processor 2652. In addition, external interface 2662 can communicate with processor 2642, so as to enable near area communication of device 2650 with other devices. External interface 2662 can provide, for example, for wired communication in some implementations, or for wireless communication in other implementations, and multiple interfaces also can be used.

Memory 2664 stores data within computing device 2650. Memory 2664 can be implemented as one or more of a computer-readable medium or media, a volatile memory unit or units, or a non-volatile memory unit or units. Expansion memory 2674 also can be provided and connected to device 2650 through expansion interface 2672, which can include, for example, a SIMM (Single In Line Memory Module) card interface. Such expansion memory 2674 can provide extra storage space for device 2650, or also can store applications or other data for device 2650. Specifically, expansion memory 2674 can include instructions to carry out or supplement the processes described above, and can include secure data also. Thus, for example, expansion memory 2674 can be provided as a security module for device 2650, and can be programmed with instructions that permit secure use of device 2650. In addition, secure applications can be provided through the SIMM cards, along with additional data, including, e.g., placing identifying data on the SIMM card in a non-hackable manner.

The memory can include, for example, flash memory and/or NVRAM memory, as discussed below. In one implementation, a computer program product is tangibly embodied in a data carrier. The computer program product contains instructions that, when executed, perform one or more methods, including, e.g., those described above. The data carrier is a computer- or machine-readable medium, including, e.g., memory 2664, expansion memory 2674, and/or memory on processor 2652, which can be received, for example, over transceiver 2668 or external interface 2662.

Device 2650 can communicate wirelessly through communication interface 2666, which can include digital signal processing circuitry where necessary. Communication interface 2666 can provide for communications under various modes or protocols, including, e.g., GSM voice calls, SMS, EMS, or MMS messaging, CDMA, TDMA, PDC, WCDMA, CDMA2000, or GPRS, among others. Such communication can occur, for example, through radio-frequency transceiver 2668. In addition, short-range communication can occur, including, e.g., using a Bluetooth®, WiFi, or other such transceiver (not shown). In addition, GPS (Global Positioning System) receiver module 2670 can provide additional navigation- and location-related wireless data to device 2650, which can be used as appropriate by applications running on device 2650.

Device 2650 also can communicate audibly using audio codec 2660, which can receive spoken data from a user and convert it to usable digital data. Audio codec 2660 can likewise generate audible sound for a user, including, e.g., through a speaker, e.g., in a handset of device 2650. Such sound can include sound from voice telephone calls, can include recorded sound (e.g., voice messages, music files, and the like) and also can include sound generated by applications operating on device 2650.

Computing device 2650 can be implemented in a number of different forms, as shown in the figure. For example, it can be implemented as cellular telephone 2680. It also can be implemented as part of smartphone 2682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying data to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A system comprising:
 a computing device comprising a memory configured to store instructions and a processor to execute the instructions to perform operations comprising:
  receiving multi-dimensional single-look data from a sensor;
  applying a number of multi-dimensional complex weighting functions including apodizations from among a general class of such functions to the multi-dimensional single-look data, so as to induce nonlinear variations in amplitude and phase of a number of multi-dimensional spectral image responses;
  forming a number of features per voxel across the number of multi-dimensional spectral image responses;
  using a multi-dimensional non-parametric classifier to form statistics from the number of features to discriminate main lobe imaged voxels from sidelobe imaged voxels with the number of multi-dimensional complex weighting functions applied to the multi-dimensional single-look data;
  identifying each voxel by thresholding the statistics formed using the multi-dimensional non-parametric classifier; and
  outputting a multi-dimensional main lobe binary image based on the identification of each voxel, wherein the multi-dimensional main lobe binary image represents main lobe locations versus sidelobe locations.

2. The system of claim 1, in which the operations include:
 processing a set of transforms to form a number of statistics based on a number of features per voxel and a number of voxels, surrounding and including each voxel under test;

identifying each voxel under test as a main lobe or sidelobe by thresholding the number of statistics; and outputting the multi-dimensional main lobe binary image based on the identification of each voxel under test.

3. The system of claim 1, further comprising instructions for:

receiving a multi-dimensional matrix comprised of signals received from any number of looks from a multi-dimensional sensor system that generates images on the basis of spectral domain processing.

4. The system of claim 1, in which a set of the number of multi-dimensional complex weighting functions is selectable in the processor according to scene parameters including scene density.

5. The system of claim 1, in which a set of the number of features and neighborhood voxels used in feature vector formation are selectable in the processor according to scene parameters including scene density.

6. The system of claim 1, in which a set of classifier weights and thresholds are selectable in the processor according to scene parameters including scene density.

7. The system of claim 1, further comprising instructions for using a discrimination engine to discriminate between main lobe versus sidelobe voxels; and wherein the discrimination engine is primed with complex nonlinear weights and feature vectors chosen to have maximal separation in their joint probability density functions.

8. The system of claim 7, wherein the complex nonlinear weights include apodization weight values raised to non-integer powers, and other weights constructed with a number of zero replacements only near the ends of the multi-dimensional complex weighting functions to avoid grating lobes.

9. The system of claim 7, wherein the discrimination engine has reduced complexity by avoiding convolution.

10. The system of claim 1, in which a set of the number of multi-dimensional complex weighting functions is selectable in the processor according to sub-volume scene parameters including scene density.

11. The system of claim 1, in which a set of the number of features and neighborhood voxels used in feature vector formation is selectable in the processor according to sub-volume scene parameters including scene density.

12. The system of claim 1, in which a set of classifier weights and thresholds is selectable in the processor according to sub-volume scene parameters including scene density.

13. The system of claim 1, further comprising a neighborhood voxel span for a multi-dimensional scene, and wherein discriminating between main lobe versus sidelobe voxels includes using a lookup table stored in the memory of the computing device to select main lobe versus sidelobe discrimination thresholds.

14. The system of claim 1 which produces voxel-level discrimination between main lobes and sidelobes.

15. A computer-implemented method comprising:

receiving multi-dimensional single-look data from a sensor;

applying a number of multi-dimensional complex weighting functions including apodizations from among a general class of such functions to the multi-dimensional single-look data, so as to induce nonlinear variations in amplitude and phase of a number of multi-dimensional spectral image responses;

forming a number of features per voxel across the number of multi-dimensional spectral image responses;

using a multi-dimensional non-parametric classifier to form statistics from the number of features to discriminate main lobe imaged voxels from sidelobe imaged voxels with the number of multi-dimensional complex weighting functions applied to the multi-dimensional single-look data;

identifying each voxel by thresholding the statistics formed using the multi-dimensional non-parametric classifier; and outputting a multi-dimensional main lobe binary image based on the identification of each voxel, wherein the multi-dimensional main lobe binary image represents main lobe locations versus sidelobe locations.

16. One or more non-transitory computer readable media storing instructions that are executable by a processing device, and upon such execution cause the processing device to perform operations comprising:

receiving multi-dimensional single-look data from a sensor;

applying a number of multi-dimensional complex weighting functions including apodizations from among a general class of such functions to the multi-dimensional single-look data, so as to induce nonlinear variations in amplitude and phase of a number of multi-dimensional spectral image responses;

forming a number of features per voxel across the number of multi-dimensional spectral image responses;

using a multi-dimensional non-parametric classifier to form statistics from the number of features to discriminate main lobe imaged voxels from sidelobe imaged voxels with the number of multi-dimensional complex weighting functions applied to the multi-dimensional single-look data;

identifying each voxel by thresholding the statistics formed using the multi-dimensional non-parametric classifier; and outputting a multi-dimensional main lobe binary image based on the identification of each voxel, wherein the multi-dimensional main lobe binary image represents main lobe locations versus sidelobe locations.

* * * * *